United States Patent [19]

Gonzales et al.

[11] Patent Number: 4,725,885
[45] Date of Patent: Feb. 16, 1988

[54] ADAPTIVE GRAYLEVEL IMAGE COMPRESSION SYSTEM

[75] Inventors: Cesar A. Gonzales, Mahopac; Joan L. Mitchell, Ossining; William B. Pennebaker, Carmel, all of N.Y.

[73] Assignee: International Business Machines Corporation, Armonk, N.Y.

[21] Appl. No.: 946,542

[22] Filed: Dec. 22, 1986

[51] Int. Cl.$^4$ ............................................. H04N 7/137
[52] U.S. Cl. ...................................... 358/135; 375/27; 375/122
[58] Field of Search ................. 358/135, 133, 136, 13; 375/27, 122

[56] References Cited

U.S. PATENT DOCUMENTS

| | | | |
|---|---|---|---|
| 4,023,199 | 5/1977 | Netravali et al. | 358/13 |
| 4,093,962 | 6/1978 | Ishiguro et al. | 358/138 |
| 4,125,861 | 11/1978 | Mounts et al. | 358/133 |
| 4,149,184 | 4/1979 | Giddings et al. | 358/81 |
| 4,292,651 | 9/1981 | Kretz et al. | 358/135 |
| 4,317,208 | 2/1982 | Araseki et al. | 375/27 |
| 4,360,840 | 11/1982 | Wolfrum et al. | 358/261 |
| 4,369,463 | 1/1983 | Anastassiou et al. | 358/135 |
| 4,462,081 | 7/1984 | Lehan | 364/554 |
| 4,488,174 | 12/1984 | Mitchell et al. | 358/136 |
| 4,540,973 | 10/1985 | Grallert | 340/347 |
| 4,541,116 | 9/1985 | Lougheed | 382/49 |
| 4,571,737 | 2/1986 | Nishitani et al. | 375/27 |
| 4,574,383 | 3/1986 | Irie et al. | 375/27 |
| 4,578,704 | 3/1986 | Gharavi | 358/135 |
| 4,593,398 | 6/1986 | Millar | 375/27 |
| 4,607,281 | 8/1986 | Starck | 358/136 |
| 4,633,325 | 12/1986 | Usubushi | 375/27 |
| 4,633,490 | 12/1986 | Goertzel | 375/122 |
| 4,656,500 | 4/1987 | Mori | 358/135 |
| 4,663,660 | 5/1987 | Fedele | 358/136 |

FOREIGN PATENT DOCUMENTS 2740945 2/1982 Fed. Rep. of Germany .

OTHER PUBLICATIONS

D. Anastassiou et al., "Gray Scale Image Coding for Freexe-Frame Videoconferencing", IEEE Trans. Commun., COM-34, 382–394, 1986.

P. Cohen et al, "Adaptive Differential Coding of Picture Signals Based on Local Contour Prediction", Natl. Telecommun. Conf. Rec., 6.1.1–6.1.6, 1976.

(List continued on next page.)

Primary Examiner—Howard W. Britton
Attorney, Agent, or Firm—Marc A. Block

[57] ABSTRACT

Apparatus and method for modelling differential pulse code modulation (DPCM) input data for entropy coding. In particular, the sign and magnitude of one piece of DPCM data after another are modelled to provide a magnitude state input and a sign state input to provide context for DPCM magnitude input and DPCM sign input, respectively, to an entropy encoder or decoder. That is, the DPCM magnitudes of earlier pieces of (context) DPCM magnitude data are re-mapped for each such earlier piece of data, the re-mapped data being aggregated to form a combined value indicative of the magnitude state input. Similarly, the DPCM signs of earlier pieces of (context) DPCM sign data are re-mapped for each such earlier piece of data, the re-mapped data being aggregated to form a combined value indicative of the sign state input. In an image data compression system, the magnitude state input serves as an activity indicator for picture elements (pixels) neighboring a "subject" pixel. According to the invention, the DPCM signal is derived from a difference value calculated by subtracting one of a plurality of predictor values from the graylevel value X of the subject pixel. The selection of predictor value P is based on the value of the magnitude state (activity indicator). In addition, the difference value is subject to adaptive quantization in which one of a plurality of quantizers is employed in assigning the (X-P) difference value to a quantization level. The selection of quantizers is also based on the value of the magnitude state (activity indicator).

16 Claims, 28 Drawing Figures

OTHER PUBLICATIONS

C. A. Gonzales, "Aggregation of Markov States in Data Compression Systems", Proc. IBM Pattern Recognition Image Processing ITL, May 20–26, 1986.

N. S. Jayant et al, "Digital Coding of Waveforms, Principles and Applications to Speech and Video", Prentice-Hall, Inc., pp. 283–312, 1984.

G. G. Langdon, "An Introduction to Arithmetic Coding", IBM J. Res. Develop., 28, 135–149, 1984.

H. Mussmann, "Predictive Image Coding", from Image Transmission Techniques, W. K. Pratte, editor, Academic Press, pp. 73–112, 1979.

A. N. Netravali et al, "Adaptive Quantization of Picture Signals Using Spatial Masking", Proc. IEEE, 536–548, 1977.

W. Zschunke, "DPCM Picture Coding with Adaptive Prediction", IEEE Trans. Commun., COM-25, 1295–1302, 1977.

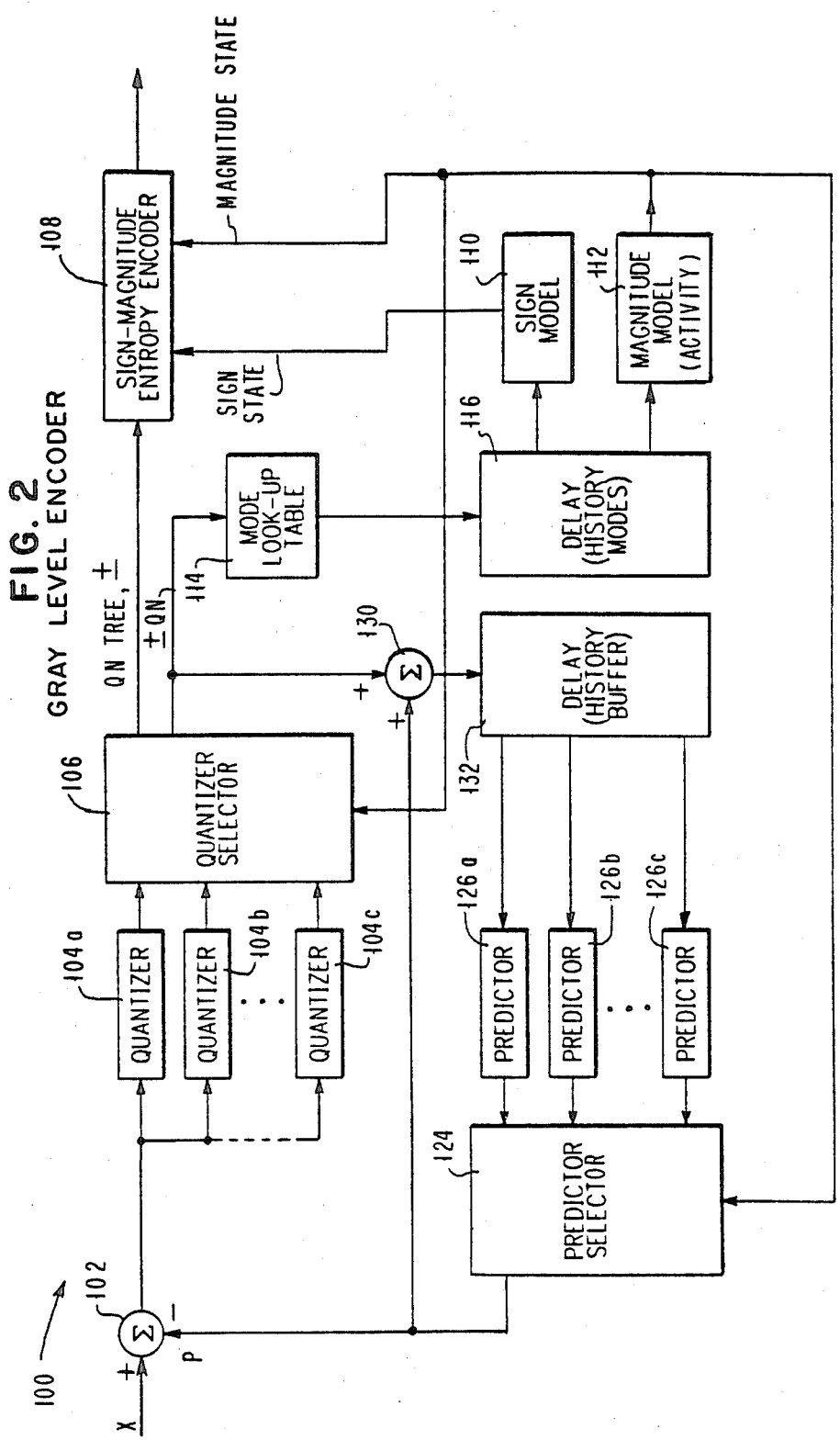

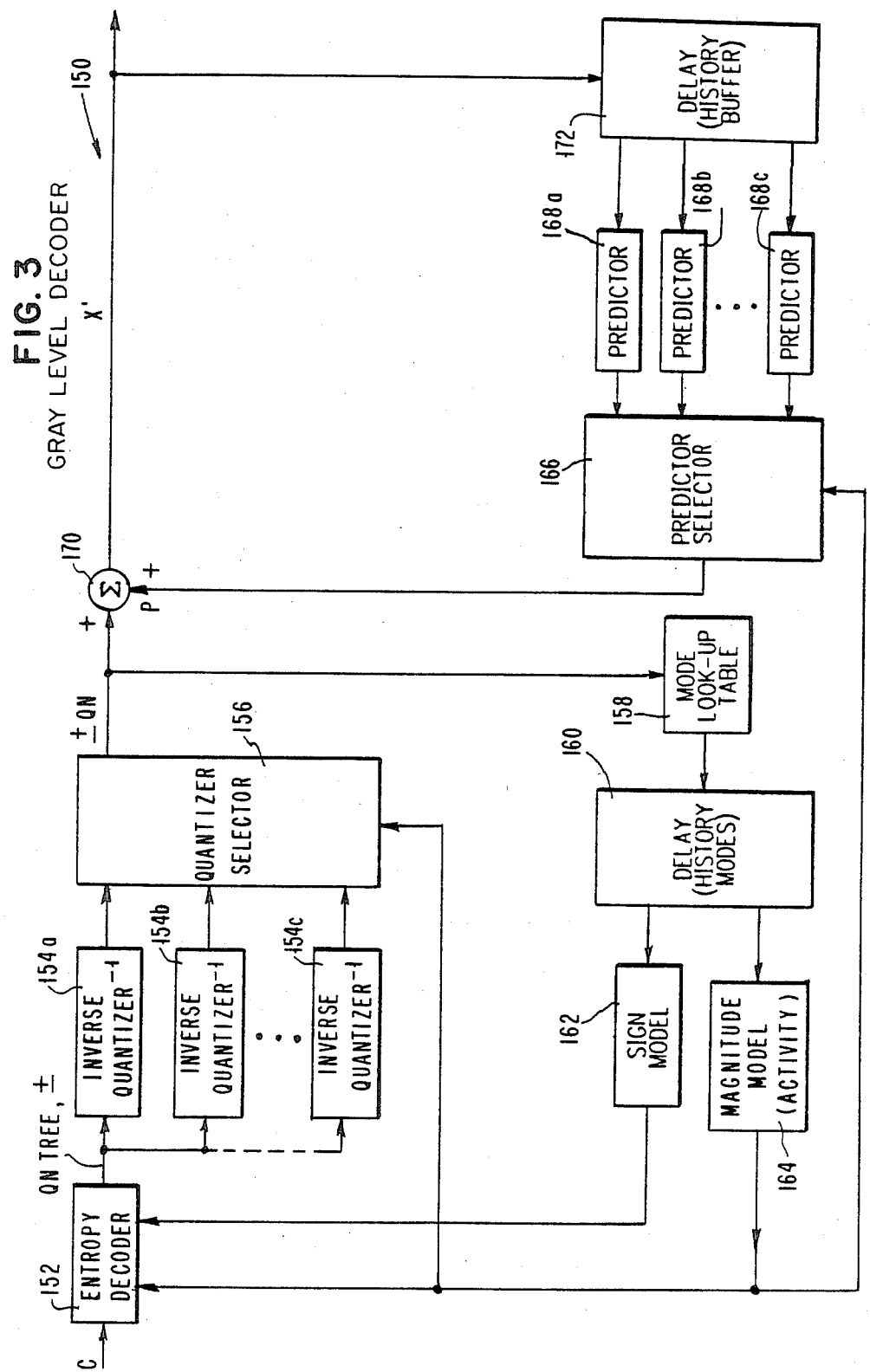

Binary Decision Tree

ADAPTIVE GRAYLEVEL IMAGE COMPRESSION SYSTEM

BACKGROUND OF THE INVENTION

I. Field of the Invention

In general, the present invention relates to differential pulse code modulation (DPCM) data compression. In particular, the invention relates to apparatus and method for modelling picture element ("pixel") data for entropy encoding.

II. Prior and Contemporaneous Technology

Oftentimes, information relating to a recorded image is to be stored or communicated. For example, in teleconferencing, successive graylevel images are to be sent rapidly and with clarity over communication links to viewers at a distant location. In the banking industry, information on bank checks is to be stored so that it may be retrieved at some later time. In facsimile and related environments, text and/or graphic images are to be communicated from one location to another.

In these various environments, the image is normally converted into a coded form so that it may be retained in limited storage and/or may be conveyed rapidly.

In the digital coding process, it is well-known to define the image at a given instant as a plurality of picture elements (referred to as "pixels" or "pels"), each of which represents a particular portion of the image. Accordingly, the image may be viewed as m lines of n pixels/line. Collectively, the lines of pixels represent the image.

Each pixel, it is noted, has a corresponding graylevel—or darkness level. One way of coding the information contained in an image is to scan the pixels line-by-line and identify the graylevel for each pixel. For example, suppose the upper left pixel is identified as $X_{1,1}$ where the first subscript corresponds to the line number and the second subscript corresponds to the pixel in the line. The second pixel in the first line is then $X_{1,2}$. If there are 480 lines and 512 pixels/line, an image for a given instant can be represented by information gathered by scanning the 480×512 pixels.

Each pixel typically has a graylevel corresponding thereto, ranging between a black value (e.g., 0) and a white value (e.g., 255). That is, given 8 bits, the graylevel of a pixel can have any of 256 values. To represent an image, the image may be scanned in a prescribed manner with the values of one pixel after another being recorded. For example, proceeding line-by-line, an image can be represented by the successively recorded values of pixels $X_{1,1}, X_{1,2}, \ldots, X_{480,512}$.

In some instances, a top-to-bottom scan of the image is referred to as a "field" and a plurality of fields are interlaced to form a "frame". For example, one field may comprise the odd-numbered lines which are scanned first and a second field may comprise the even-numbered lines which are scanned thereafter. The two fields together form a single "frame".

The above straightforward approach results in a large number of bits required for each image to be recorded. The large number of bits can make the storing and/or rapid conveying of data impractical where storage space is limited or rapid data transfer is required.

To address the problem of reducing the number of required bits, a number of data compression techniques have been taught.

One technique of data compression is referred to as "entropy coding". In entropy coding, the number of bits used in representing events is intended to be inversely related to event probability. More probable events are represented by codewords characterized by a relatively short length (of bits) whereas less probable events are represented by relatively longer lengths.

To perform entropy coding, an entropy coder typically receives two inputs. The first input is a decision and the second input is a state input which provides a context for the decision input. For example, a binary decision input may represent a heads or tails event for a coin toss; or an ON or OFF condition for a switch; or a 1 or 0 value of a bit in a string. The state input may—usually based on history, theory, or estimate—provide some contextual index which suggests how the decision input is to be processed. For example, in an image in which a pixel may be either black or white, different neighborhoods of the pixel may have different likelihoods of the pixel therein being white. That is, each neighborhood has a respective estimated black-white probability ratio associated therewith. Hence, to provide meaning to the decision input, a state input is furnished to reflect the neighborhood corresponding to the decision input. Based on the state input, the entropy coder transforms the decision input into a codeword of appropriate length.

The state input to the entropy coder is the result of modelling, i.e. defining the contexts under which codewords are assigned to decisions. A well-known example is taught in the literature as Markov states. The efficiency of the entropy encoder depends on the quality of the modelling—that is, how well the state input to the entropy coder represents variations in the probability of the decision input.

The correct assignment of codeword lengths is dictated by information theory concepts and is based on the estimated probability of occurrence of the events. The better the probability estimate, the more efficient the codeword length assignment, and the better the compression.

One example of an entropy coder is described in detail in co-pending patent applications: "ARITHMETIC CODING DATA COMPRESSION/DE-COMPRESSION SELECTIVELY EMPLOYED, DIVERSE ARITHMETIC CODING ENCODERS AND DECODERS", invented by J. L. Mitchell and W. B. Pennebaker, U.S. Ser. No. 06/907,700; "PROBABILITY ESTIMATION BASED ON DECISION HISTORY", invented by J. L. Mitchell and W. B. Pennebaker, U.S. Ser. No. 06/907,695; and "ARITHMETIC CODING ENCODER AND DECODER SYSTEM" (Q-coder), invented by G. G. Langdon, Jr., J. L. Mitchell, W. B. Pennebaker and J. J. Rissanen, U.S. Ser. No. 06/907,714.

The invention disclosed in the above-cited co-pending patent applications were invented by the present inventors and co-workers thereof at the IBM Corporation; said applications being incorporated herein by reference for their teachings involving entropy coding, or more specifically arithmetic coding and adaptive probability estimation.

Other entropy coders include Huffmann coding coders and Elias coding coders. Numerous publications describe such coding approaches.

Another technique used in data compression is referred to as "Differential Pulse Code Modulation" (DPCM). According to basic DPCM teachings, a predicted value based on one or more neighboring pixel values is determined for a "subject" pixel—i.e., a pixel whose informational content is currently being coded. The difference between the value for the subject pixel and the predicted value is then used as a basis for subsequent coding. Where there is high correlation between nearby pixels, using the difference value rather than the actual measured value can result in significant compression. Typically, a factor-of-two compression can be achieved by using DPCM techniques to obtain reasonably good quality pictures.

SUMMARY OF THE INVENTION

In accordance with the present invention, DPCM coding is used in conjunction with entropy coding to provide enhanced data compression, especially in an image data compression environment.

In particular, one pixel after another is selected as a "subject" pixel. In close proximity to the subject pixel are neighboring pixels. Each neighboring pixel has associated therewith a previously determined difference signal value. In accordance with a quantization table, the magnitude of the difference of each neighboring pixel is represented by a quantization level. For example, from a value of 1 to a threshold difference signal value of 9 may be a first quantization level (e.g., represented by a value "4"); from 10 to 17 may be a second quantization level (e.g., represented by a value "12"); . . . ; and from 249 upward may be a final quantization level (e.g., represented by a value "255"). The quantization levels, in turn, are re-mapped. In the remapping, preferably a first set including the lowest quantization levels are re-mapped as a binary string of 0 bits; a second set including next higher quantization levels are re-mapped as a binary string of 0 bits followed by at least one 1 bit in less (least) significant bits; . . . ; and a last set including the highest quantization levels are re-mapped as a binary string of all 1 bits. Each neighboring pixel has a re-mapped value corresponding thereto.

The re-mapped values of the neighboring pixels are aggregated to provide a single value representing the pixel neighborhood of the subject pixel. It is noted that the re-mapping and aggregating steps serve to reduce exponentially the number of possible states over more conventional Markov models. In general, the aggregation of re-mapped values provides a reduction in the binary representation of the neighborhood pixels from $m^N$ (or m**N) possible history representations (or states) to m history representations (or states), where N is the number of neighboring pixels and m is the number of possible re-mapped values for each neighboring pixel. (In this specification, the single asterisk (*)—when used in a mathematical expression—shall represent the multiplication operation. The double asterisk (**)—when used in a mathematical expression—shall represent the exponentiation operation.)

With the pixel to the left of a subject pixel being A, the pixel to the upper left diagonal being B, the pixel above being C, and the pixel to the upper right diagonal being D, re-mapped magnitude values MMn are assigned (where n identifies a pixel A, B, C, or D). In determining the magnitude state, the following aggregation formula is preferably applied:

| State | Definition |
|-------|------------|
| 0 | Mmax = 0000 |
| 1 | Mmax = 0001 |
| 2 | Mmax = 0011 |
| 3 | Mmax = 0111 |
| 4 | Mmax = 1111 | where Mmax=MMA|MMB|MMC|MMD. (In this specification, the vertical bar (|) represents the logical OR.)

By employing the re-map and aggregation approach, the present invention achieves the objects of simple implementation and computational efficiency.

Each aggregated value, it is noted, corresponds to a respective "magnitude" state (from 0 to 4) which reflects the DPCM magnitudes of the pixels neighboring a subject pixel. That is, the aggregated magnitude state determined from the neighboring pixels of a subject pixel represents a history, or context, for the probabilities of the DPCM value corresponding to the subject pixel.

The aggregated magnitude state serves as the state input to an entropy coder used to compress a DPCM value applied thereto.

The aggregated magnitude state corresponding to the aggregated value is also used in adaptive quantization. In particular, a plurality of quantizers are provided. One of the quantizers is selected for a subject pixel, the selection being based on the magnitude state corresponding to the subject pixel.

The aggregated magnitude state corresponding to the aggregated value is also used in adaptive prediction. In accordance with the invention, a plurality of selectable predictors are provided for DPCM coding. That is, one of a plurality of predictors is selected to be subtracted from the graylevel value corresponding to the subject pixel, in order to provide a difference (signal) value. The selection of predictors is determined by the magnitude state corresponding to the subject pixel.

In accordance with the invention, then, difference signal values of neighboring pixels are quantized and re-mapped, with the re-mapped values being aggregated—the aggregated value representing a magnitude state indicative of the surroundings or history or context of the subject pixel. The magnitude state serves the triple function of (1) providing a state input to an entropy encoder; (2) providing an input for selecting one of a plurality of quantizers for the subject pixel; and (3) providing an input for selecting one of a plurality of selectable predictors for use in determining the difference value in a DPCM coding of the subject pixel.

While the selected predictor and selected quantizer are always the same for any given magnitude state, they can vary from state to state. This feature substantially reduces the computational requirements of the present system, when compared to other algorithms of the prior technology.

Switched prediction is primarily responsible for the robustness of the present invention in efficiently handling very dissimilar graylevel images from head and shoulder scenes to graphics and text. Switched quantization is primarily responsible for about 7% higher compression rates.

The present coding approach, it is noted, preferably separates the DPCM sign and DPCM magnitude for entropy coding. That is, in addition to processing DPCM magnitude (as discussed above), the present invention also provides a DPCM sign model. As with the magnitude model, the sign model provides a plurality of possible sign values (e.g., from strong negative to strong positive) which are aggregated to generate a "sign" state according to a formula.

A preferred sign model represents DPCM sign in binary form to indicate (a) no sign as 000, (b) "weak plus" as 010, (c) "weak minus" as 001, (d) "strong plus" as 110, and (e) "strong minus" as 101. One of these binary representations is applied to each of the neighboring pixels and is designated as MSn (where n identifies pixels A, B, C, or D). In aggregating the DPCM sign state, the following formula is preferably applied:

MSA; (MSA|MSB|MSC|MSD)

where the semicolon (;) represents concatenation.

Hence, a DPCM magnitude value and a state corresponding thereto are determined; and a DPCM sign and a state corresponding thereto are determined. For each subject pixel, the magnitude is entropy encoded conditioned on the corresponding magnitude state; and the sign is entropy encoded conditioned on the corresponding sign state. Since the magnitude and sign states are generated using history data only, they need not be transmitted, i.e. the decoding apparatus can also generate said states from history.

Each of the above features—(a) aggregating the re-mapped magnitude values to provide a reduced number of magnitude states; (b) employing the magnitude state corresponding to the activity or history of a subject pixel for entropy coding, adaptive quantization, and adaptive prediction; and (c) providing separate models for entropy encoding of the magnitude and sign of the DPCM difference value result in simplified implementation, computational efficiency, and excellent compression performance.

The present invention is applicable where an image is fixed (as in a photograph) or changes from time to time (as in a television or teleconferencing transmission). The present invention, as described herein, applies to images in general regardless of how generated.

Moreover, the invention also extends to environments other than image data processing where events—other than pixels—may be examined in similar fashion.

BRIEF DESCRIPTION OF THE DRAWINGS

FIG. 2 is a block diagram showing, in general, an image data compression encoder according to the present invention.

FIG. 3 is a block diagram showing, in general, an image data compression decoder according to the present invention.

DESCRIPTION OF THE INVENTION

Figure 1:
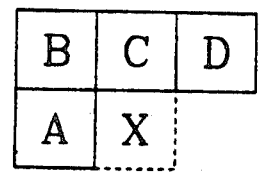
FIG. 1 is a diagram showing a subject pixel and neighboring pixels used in the DPCM coding of information relating to the subject pixel.

Referring to FIG. 1, a portion of an image is shown to include a plurality of pixels A, B, C, D, and X. Assuming that the image is scanned from left to right one line after another down the image, pixel X (a "subject" pixel) is considered the current pixel in the current line. Pixel A is the pixel scanned just prior to pixel X. The pixels B, C, and D represent pixels in a previously scanned line.

According to the invention, pixels A through D represent the neighboring pixels of pixel X. Information relating to the neighboring pixels is used in coding the information contained in pixel X by using entropy coding and DPCM coding.

Referring to FIG. 2, a data compression encoder 100 is shown. The graylevel value X (for pixel X) enters an adder 102 together with a predicted value P. The adder 102 subtracts P from X to provide as output a difference signal. The difference signal is directed to quantizers 104a through 104c. Each quantizer 104a through 104c associates difference values in some range to a single quantization level. That is, each quantizer 104a through 104c converts difference value input to quantized output according to a table. Two tables (Table 1 and Table 2) are provided hereinbelow. The first column THRESHV sets forth ranges of magnitude difference values and the second sets forth a quantization level (QN) assigned to each range. Table 1 includes 14 ranges and 14 associated QN values. It is noted that the decision threshold values and quantization levels are each multiplied by two. By doubling the decision threshold and quantization levels, an extra bit of precision is realized. The reason for the extra precision is that the predicted values and the DPCM differences are also computed with an extra digit precision. Experiments have shown compression improvements when the arithmetic is performed in this manner. Table 2 includes 12 ranges and 12 QN values. The latter table is a coarser table than Table 1 in the lower quantization ranges.

TABLE 1

| THRESHV decision threshold | Qn |
|---|---|
| 2 * 9 | 2 * 4 |
| 2 * 17 | 2 * 12 |
| 2 * 28 | 2 * 22 |
| 2 * 41 | 2 * 34 |
| 2 * 56 | 2 * 48 |
| 2 * 73 | 2 * 64 |
| 2 * 92 | 2 * 82 |
| 2 * 113 | 2 * 102 |
| 2 * 136 | 2 * 124 |
| 2 * 161 | 2 * 148 |
| 2 * 188 | 2 * 174 |
| 2 * 217 | 2 * 202 |
| 2 * 248 | 2 * 232 |
| infinity | 2 * 255 |

The first range in Table 1 extends from 0 to 2*9 minus one and is identified by the quantization level 2*4; all values in the range being assigned the value 2*4. The second range extends from 2*9 to 2*17 minus one; all values in the second range being assigned the value 2*12. The third range through thirteenth range are similarly defined and have associated QN values. The fourteenth range extends beyond 2*248 to infinity and is represented by a quantization level 2*255.

Table 2 is similarly configured but with fewer ranges being provided.

TABLE 2

| decision threshold | Qn |
|---|---|
| 2 * 15 | 2 * 6 |
| 2 * 32 | 2 * 22 |
| 2 * 52 | 2 * 42 |
| 2 * 73 | 2 * 62 |
| 2 * 92 | 2 * 82 |
| 2 * 113 | 2 * 102 |
| 2 * 136 | 2 * 124 |
| 2 * 161 | 2 * 148 |
| 2 * 188 | 2 * 174 |
| 2 * 217 | 2 * 202 |
| 2 * 248 | 2 * 232 |
| infinity | 2 * 255 |

Logic 106 selects one of the quantizers 104a through 104c. The selector output apart from entering adder 130 to generate reconstructed pixel data (as is conventional in DPCM coders), also provides inputs to two other elements. First, a representation of the quantization level output, extended by its associated sign, enters an entropy encoder 108. This representation can be the binary number representation of the quantization level, but more generally, it will be a binary representation that facilitates the entropy coding process (QN tree). The entropy coder 108 processes decision inputs (e.g., decision inputs indicative of quantization levels) and assigns codes thereto. The code assigned to a given decision has a length inversely related to the probability of the given decision occurring. The more likely a quantization level is, the smaller the code assigned thereto by the entropy encoder 108.

The entropy encoder 108 is preferably an arithmetic coding encoder as described in the co-pending Q-coder patent application cited above. Alternatively, the entropy encoder 108 may include a Huffmann coding encoder. The entropy encoder 108, in addition to the quantization level (extended by its sign), has state inputs applied thereto. As discussed hereinbelow, the state inputs provide context for the decision input. For example, the entropy encoder 108 may include a table of decision probabilities, a pointer for indicating a current decision probability, and a methodology of selecting the next decision probability following the current decision probability in response to the occurrence of a particular next decision. For different types of decisions or the same decision based on different histories, the position of the pointer in the probability table varies. The state input would indicate where in the probability table the pointer should be positioned before processing the next decision. State inputs are described in the aforementioned copending Q-coder patent application and in entropy coding literature.

In the FIG. 2 embodiment, two alternate state inputs are shown. One represents the state input for a sign model 110 and the other represents the state input for a magnitude model 112. In this regard, it is observed that DPCM results in the introduction of a sign aspect. (In subtracting P from X, the difference value may be positive or negative.) Information regarding the DPCM sign is furnished to the entropy encoder 108 as well as DPCM (quantization level) magnitude information. The DPCM sign information is simply a bit indicating + or −, said bit being readily determined by a comparator (not shown) which compares X and P. The decision to the entropy encoder 108 is alternately quantization level type information or sign type information. When quantization level information enters the entropy encoder 108, a magnitude state input is applied to the entropy encoder 108; when sign information enters, a sign state input is applied.

The quantization level output QN from a selected quantizer 104a through 104c and its associated sign enter a mode look-up table (LUT) 114. In the look-up table 114, the quantization levels are re-mapped to a greatly reduced number of representative values. Similarly, the sign of the difference value is also re-mapped according to the following binary definitions: (a) no sign corresponds to 000 (zero magnitude), (b) "weak plus" corresponds to 010, (c) "weak minus" corresponds to 001, (d) "strong plus" corresponds to 110, and (e) "strong minus" corresponds to 101.

The re-mapped magnitude of a pixel n is defined as MMn and the re-mapped sign of a pixel n is defined as MSn.

Tables 3 and 4 (below) illustrate a re-mapping scheme according to the invention for the two quantization Tables 1 and 2.

TABLE 3

| decision threshold | Qn | MMn | MSn + | MSn − |
|---|---|---|---|---|
| 2 * 9 | 2 * 4 | 0000 | 010 | 001 |
| 2 * 17 | 2 * 12 | 0001 | 110 | 101 |
| 2 * 28 | 2 * 22 | 0011 | 110 | 101 |
| 2 * 41 | 2 * 34 | 0111 | 110 | 101 |
| 2 * 56 | 2 * 48 | 0111 | 110 | 101 |
| 2 * 73 | 2 * 64 | 1111 | 110 | 101 |
| 2 * 92 | 2 * 82 | 1111 | 110 | 101 |
| 2 * 113 | 2 * 102 | 1111 | 110 | 101 |
| 2 * 136 | 2 * 124 | 1111 | 110 | 101 |
| 2 * 161 | 2 * 148 | 1111 | 110 | 101 |
| 2 * 188 | 2 * 174 | 1111 | 110 | 101 |
| 2 * 217 | 2 * 202 | 1111 | 110 | 101 |
| 2 * 248 | 2 * 232 | 1111 | 110 | 101 |
| infinity | 2 * 255 | 1111 | 110 | 101 |

TABLE 4

| decision threshold | Qn | MMn | MSn + | MSn − |
|---|---|---|---|---|
| 2 * 15 | 2 * 6 | 0000 | 010 | 001 |
| 2 * 32 | 2 * 22 | 0011 | 110 | 101 |
| 2 * 52 | 2 * 42 | 0111 | 110 | 101 |
| 2 * 73 | 2 * 62 | 1111 | 110 | 101 |
| 2 * 92 | 2 * 82 | 1111 | 110 | 101 |
| 2 * 113 | 2 * 102 | 1111 | 110 | 101 |
| 2 * 136 | 2 * 124 | 1111 | 110 | 101 |
| 2 * 161 | 2 * 148 | 1111 | 110 | 101 |
| 2 * 188 | 2 * 174 | 1111 | 110 | 101 |
| 2 * 217 | 2 * 202 | 1111 | 110 | 101 |
| 2 * 248 | 2 * 232 | 1111 | 110 | 101 |
| infinity | 2 * 255 | 1111 | 110 | 101 |

The re-mapped magnitude value and re-mapped sign value of one pixel after another (as the "subject" pixel) are looked up in the table 114 and stored in a HISTORY MODES DELAY 116. The re-mapped magnitude values and re-mapped sign values for all the neighboring pixels A through D of pixel X (the current "subject" pixel) have been stored in the DELAY 116.

The sign model 110 and magnitude model 112 receive the re-mapped sign values and re-mapped magnitude values, respectively, as inputs and generate respective states in response thereto.

The magnitude model 112 is now described.

Magnitude Model

In the re-mapping step previously discussed, the 14 quantization levels of Table 1 and the 12 quantization levels of Table 2 are represented by one of the following five four-bit representations 0000, 0001, 0011, 0111, or 1111. In observing the re-mapping schemes, it is noted that—for higher quantization levels—more of the less significant bits of MMn are set. For the lowest quantization level(s), the re-mapped value is 0000. For the highest quantization levels, the re-mapped value is 1111.

Using the MM-values stored in the DELAY 116, the magnitude model 112 defines the magnitude state of the current subject pixel as:

| State | Definition |
|---|---|
| 0 | Mmax = 0000 |
| 1 | Mmax = 0001 |
| 2 | Mmax = 0011 |
| 3 | Mmax = 0111 |
| 4 | Mmax = 1111 | where Mmax=MMA|MMB|MMC|MMD.

Based on the formula, one of the five states 0 through 4 is attributed to the current subject pixel (pixel X). The state is entered as the magnitude state input to the entropy encoder 108 to provide a context for the quantization level input.

The magnitude state corresponding to a pixel X is a unique measure of the "activity" in the neighboring pixels (which were previously scanned and processed). In particular, the results of the aggregation formula provide a gestalt-type view of the neighboring pixels. That is, $2\alpha$ graylevel differences (where $\alpha$ is some positive integer) at four neighboring pixels are assigned to quantization levels; the quantization levels are re-mapped to MMn values which are four bits in length; and the above formula is applied to the re-mapped values so that only the "maximum" of the adjacent pixel values is used in defining states 0 through 4.

The magnitude state also provides input to logic 124 which selects one of a plurality of predictors 126a through 126c, and to logic 106 which selects one of a plurality of quantizers 104a through 104c. This process of adaptive prediction and adaptive quantization is described in greater detail below.

Adaptive Quantization

The magnitude state value (0 through 4) is also directed to the quantizer selection logic 106. In the preferred embodiment, one of the two quantizers represented by Tables 1 and 2, is selected according to the following scheme:

For state 0:
   If DIFFM<10 then:
      assign QN=0
   else
      Use Table 1 to determine QN
   endif
For state 1:
   Use Table 1 to determine QN
For states 2, 3, and 4:
   Use Table 2 to determine QN
where DIFFM is twice the magnitude of the DPCM difference value at pixel X. It should be noted that for state 0, the additional value of QN=0 has been included.

By introducing coarser quantization, the root mean square measure of image distortion increases; however, this increase is not reflected in a similar increase in perceived distortion. Experiments show that, since the coarse quantizer of Table 2 is only used in active areas of the image, the added distortion is hidden by the masking effect of the human eye.

Adaptive Prediction

The quantization level output from logic 106 (of FIG. 2) also enters an adder 130.

The adder 130 combines the quantization level Q—which roughly corresponds to the difference value (X-P)—and the current predictor value P to generate a reconstructed value. A history of reconstructed values determined for previously scanned pixels are stored in DELAY 132. Predictors 126a through 126c combine predetermined values stored in the DELAY 132 to provide respective, selectable predictor values.

In a preferred embodiment there are two predictors 126a and 126b. Predictor 126a sets P equal to the value stored in the DELAY for pixel A. Predictor 126b is a slope predictor which defines P as:

$$P = A + \frac{(C - B)}{2}$$

Predictor selection (regardless of the number of predictors) is determined by the magnitude state. With the above-noted two predictors 126a (P=A) and 126b (the slope predictor P), the switching strategy is: (1) for magnitude state 0, use slope predictor 126b and (2) for magnitude states 1, 2, 3, and 4, use predictor 126a (P=A). The predictor is thus selected based on the measure of "activity" provided by the magnitude state.

DPCM Sign Model

The model for entropy coding of the sign of the quantized DPCM difference is based on the signs of the coded differences at A, B, C, and D. In the present model there is discrimination between the signs associated with the small quantization levels (weak sign) and the signs with larger levels (strong sign). Exact sign definitions used in the present system are found in Tables 3 and 4. When the quantized DPCM magnitude is zero (as in state 0 of the magnitude model), a "no sign" is defined. The binary representation for these signs are:

| Definition | Binary Representation |
|---|---|
| No sign (zero) | 000 |
| Weak plus (+) | 010 |
| Weak minus (−) | 001 |
| Strong plus (++) | 110 |
| Strong minus (− −) | 101 |

It is observed that the most significant bit (msb) is set for "strong" signs, the middle bit is set for "plus", and the least significant bit (lsb) is set for "minus". A Markov model that uses the A, B, C, and D neighborhood would result then in 625 possible states. As was the case with the modelling of the DPCM magnitude, it is desirable to reduce the number of states by aggregating some of them through an empirical formula. The aggregation formula is shown below:

MSA; (MSA|MSB|MSC|MSD)

where MSA, MSB, MSC, and MSD are the signs of pixels A, B, C, and D in their binary representation. The result of this formula gives the binary representation for the aggregated state. Because of the states' binary representation (6 bits), it is convenient to allocate storage for the statistics of 64 aggregated states. However, it is readily noted that, for the aggregation formula shown above, only 35 states are possible.

A significant benefit of the above formula is that it is very similar to the aggregation formula for the DPCM magnitude model. A mode function is in fact definable as the concatenated MMn and MSn values:

Mn=MMn; MSn

By using the mode function, the evaluation of the second term in the sign formula is carried out simultaneously with the evaluation of the DPCM magnitude state.

Graylevel Decoder

In FIG. 3 is a graylevel decoder 150. Compressed data in binary form enters an entropy decoder 152 which produces as output, a binary sequence (see discussion on BSTREAM hereinbelow) which represents an index. The index identifies a QN value in each of a plurality of inverse quantizers 154a through 154c. One of the inverse quantizers is selected by a selector 156 to provide a corresponding QN output. The QN and its associated sign output from the selector 156 enters a MODE LUT 158. The MODE LUT 158 provides input to a DELAY 160, the output from which enters a sign model 162 and magnitude (activity) model 164. Elements 158 through 164 operate the same as counterpart elements in the graylevel encoder 100. The sign model 162 outputs a sign state input of the entropy decoder 152. The magnitude model 164 provides its output to (a) the entropy decoder 152, (b) the inverse quantizer selector 156, and (c) a predictor selector 166.

The predictor selector 166 chooses one of a plurality of predictor values (based on reconstructed history data) generated by predictors 168a through 168c. In the prediction selection, the most recent selected predictor value P is added to the selected quantization value QN in adder 170 to yield a reconstructed graylevel value X' for a subject pixel. X' is stored in a DELAY buffer 172 and is used (together with earlier generated X' values) to compute subsequent predictor values. Predictors 168a through 168c correspond to the predictors 126a through 126c of the graylevel encoder 100 and are selected (based on activity) in a manner similar to the adaptive prediction in the graylevel encoder 100.

Binary Decision Tree

Figure 4:
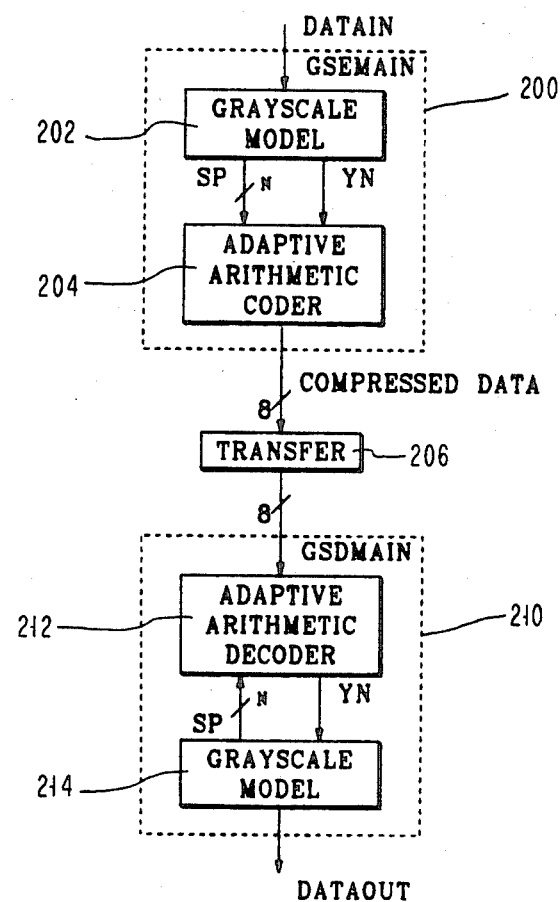
FIG. 4 is a block diagram showing an image data compression/de-compression system including grayscale encoding and decoding according to the present invention in conjunction with adaptive arithmetic encoding and decoding.

Referring to FIG. 4, a graylevel encoder 200—like that depicted in FIG. 2—comprises a grayscale model 202 which provides a state input (in the form of a statistics pointer SP) and a decision input YN to a binary arithmetic encoder 204. (The arithmetic encoder 204 corresponds to the entropy encoder 108 of FIG. 2.) The output of the arithmetic encoder 204 is compressed data which is transferred by element 206 to be later decoded by a graylevel decoder 210 like that depicted in FIG. 3. The gray level decoder 210 includes an arithmetic decoder 212 which operates in conjunction with a grayscale model 214. The elements of decoder 210 correspond to the elements in the encoder 200 and function to undo the coding. An adaptive arithmetic encoder and corresponding decoder are described in the aforementioned co-pending patent applications.

The preferred embodiments of the encoder 204 and decoder 212 process binary decision inputs as suggested by the YN input label. The decisions discussed previously with regard to graylevel are multisymbol rather than binary.

In order to enable a binary arithmetic encoder 204 and binary arithmetic decoder 212 to operate in conjunction with the grayscale models 202 and 214, the graylevel decisions are formatted in binary by a treeing methodology as suggested by the "QN tree" label in FIG. 2.

Figure 5:
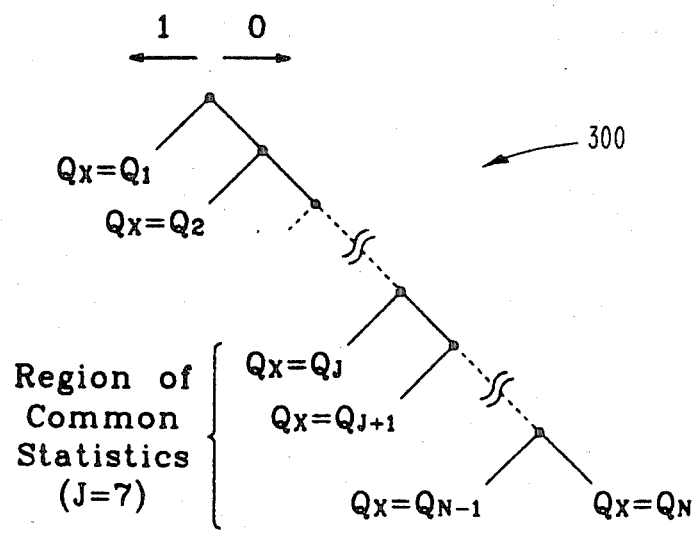
FIG. 5 is an illustration of a binary decision tree.

In FIG. 5, a binary decision tree 300 is illustrated. The binary decision tree converts multilevel data into a binary data sequence. That is, each of the fourteen quantization levels of Table 1 or the twelve quantization levels of Table 2 is represented by a sequence of binary decisions. The binary sequence that represents a given quantization level is determined by following the tree from the root down to the corresponding leaf. If the left branch is taken and a "leaf" is reached, a "1" is coded; otherwise a "0" is coded.

For each state (0 through 4), there is a respective tree having its own allocated storage. It is noted that, for the various trees, there is a region of "common statistics". One of the trees is illustrated in FIG. 5.

In FIG. 5, it is noted that the probability distribution associated with each binary decision is estimated separately from other binary decisions. For the Q-coder of the co-pending application this means that separate storage is allocated for each one of the nodes in the trees.

Theoretically, other binary trees with the same leaves as the trees shown in FIG. 5 may be used without any loss in compression rate. However, such other trees may result in increased computational effort. The tree in FIG. 5 is matched to the statistics of the quantization levels so that the expected length of the tree-generated sequence approaches a minimum.

The quantization Tables 5 and 6 (below) show hexadecimal codes for the binary decision stream which can be used for efficiently traversing the decision trees. In the preferred implementation of the system, this hex code is loaded into a register which is then tested for the presence of a negative number (a "1" in the most significant bit). After every test, a shift to the left by one readies the register for testing the next bit in the stream. A detected negative bit indicates either a leaf or a region of "common" statistics. From the seventh entry (QN=2*82 in Table 5, QN=2*124 in Table 6), the statistics areas are the same regardless of state.

TABLE 5

| decision threshold | Qn | binary stream | MMn | MSn + | MSn − |
|---|---|---|---|---|---|
| 2 * 9 | 2 * 4 | hex 8000 | 0000 | 010 | 001 |
| 2 * 17 | 2 * 12 | hex 4000 | 0001 | 110 | 101 |
| 2 * 28 | 2 * 22 | hex 2000 | 0011 | 110 | 101 |
| 2 * 41 | 2 * 34 | hex 1000 | 0111 | 110 | 101 |
| 2 * 56 | 2 * 48 | hex 0800 | 0111 | 110 | 101 |
| 2 * 73 | 2 * 64 | hex 0400 | 1111 | 110 | 101 |
| 2 * 92 | 2 * 82 | hex 0300 | 1111 | 110 | 101 |
| 2 * 113 | 2 * 102 | hex 0280 | 1111 | 110 | 101 |
| 2 * 136 | 2 * 124 | hex 0240 | 1111 | 110 | 101 |
| 2 * 161 | 2 * 148 | hex 0220 | 1111 | 110 | 101 |
| 2 * 188 | 2 * 174 | hex 0210 | 1111 | 110 | 101 |
| 2 * 217 | 2 * 202 | hex 0208 | 1111 | 110 | 101 |
| 2 * 248 | 2 * 232 | hex 0204 | 1111 | 110 | 101 |
| infinity | 2 * 255 | hex 0202 | 1111 | 110 | 101 |

TABLE 6

| decision threshold | Qn | binary stream | MMn | MSn + | MSn − |
|---|---|---|---|---|---|
| 2 * 15 | 2 * 6 | hex 8000 | 0000 | 010 | 001 |
| 2 * 32 | 2 * 22 | hex 4000 | 0011 | 110 | 101 |
| 2 * 52 | 2 * 42 | hex 2000 | 0111 | 110 | 101 |
| 2 * 73 | 2 * 62 | hex 1000 | 1111 | 110 | 101 |
| 2 * 92 | 2 * 82 | hex 0800 | 1111 | 110 | 101 |
| 2 * 113 | 2 * 102 | hex 0400 | 1111 | 110 | 101 |
| 2 * 136 | 2 * 124 | hex 0300 | 1111 | 110 | 101 |
| 2 * 161 | 2 * 148 | hex 0280 | 1111 | 110 | 101 |
| 2 * 188 | 2 * 174 | hex 0240 | 1111 | 110 | 101 |
| 2 * 217 | 2 * 202 | hex 0220 | 1111 | 110 | 101 |
| 2 * 248 | 2 * 232 | hex 0210 | 1111 | 110 | 101 |
| infinity | 2 * 255 | hex 0208 | 1111 | 110 | 101 |

In examining the bit stream values of Table 5, by way of example, it is noted that the first table entry Q1—which corresponds to 2*4—is represented by hex 8000, or 1000 0000 0000 0000 in binary. The second table entry Q2—which corresponds to 2*12—is represented by hex 4000, or 0100 0000 0000 0000 in binary. The seventh entry in Table 5, Q7 is represented by the binary sequence 0000 0011 0000 0000 (i.e., hex 0300).

Referring again to FIG. 2, the tree processing may be performed by a convertor that may be positioned along the decision input line to the entropy encoder 108. Alternatively, the quantization level may be converted to its respective binary sequence in each quantizer 104a through 104c with the tree's binary sequence being directly provided to the input of the entropy encoder 108 (this is the approach suggested in FIG. 2.). The latter approach, which is preferred, requires a second output from the selected quantizer that conveys the multilevel values needed in the adder 130 and the mode look-up table 114. A further enhancement results if the mode re-mapping is also directly provided by a third output from the quantizer, enabling the quantization, binarization, and mode re-mapping, to be performed from a single stored table (see Table 5 or Table 6).

In any case, instead of a value such as 2*4 or 2*255 being entered as input to the entropy encoder 108, the tree conversion provides entry of binary decision inputs such as 1000 0000 0000 0000 or 0000 0010 0000 0010 instead.

In state 0, the adaptive quantization described above can generate a value of QN=0. This unique case is coded separately through a single binary decision before the method described above is applied. That is, in state 0, the tree described above is generated only if QN is not zero.

Implementation of the gray scale compressor and decompressor system.

The graylevel coding system including Q-coder binary arithmetic coding (referred to as QCGRAY) has been implemented on an IBM Personal Computer-AT in accordance with the following algorithms and tables.

Tables 7 and 8 (below) are used for the adaptive quantization. They correspond to Tables 5 and 6. Each row has entries for THRESHV (doubled for 9 bit precision), QN (doubled for 9 bit precision), BSTREAM (the tree bit pattern for encoding QN), MN+ for positive sign and MN− for negative sign. The last 4 bytes are reserved, but not used. By incrementing the table pointer by 12 bytes, the next row in the table is accessed. Table 7 is used for magnitude state 0 and for magnitude state 1. Table 8 is used for magnitude states 2, 3, and 4.

TABLE 7

| THRESHV 2 bytes | QN 2 bytes | BSTREAM 2 bytes | MN+ 1 byte | MN− 1 byte | unused 4 bytes |
|---|---|---|---|---|---|
| 2 * 9 | 2 * 4 | hex 8000 | hex 04 | hex 02 | 0 |
| 2 * 17 | 2 * 12 | hex 4000 | hex 1c | hex 1a | 0 |
| 2 * 28 | 2 * 22 | hex 2000 | hex 3c | hex 3a | 0 |
| 2 * 41 | 2 * 34 | hex 1000 | hex 7c | hex 7a | 0 |
| 2 * 56 | 2 * 48 | hex 0800 | hex 7c | hex 7a | 0 |
| 2 * 73 | 2 * 64 | hex 0400 | hex fc | hex fa | 0 |
| 2 * 92 | 2 * 82 | hex 0300 | hex fc | hex fa | 0 |
| 2 * 113 | 2 * 102 | hex 0280 | hex fc | hex fa | 0 |
| 2 * 136 | 2 * 124 | hex 0240 | hex fc | hex fa | 0 |
| 2 * 161 | 2 * 148 | hex 0220 | hex fc | hex fa | 0 |
| 2 * 188 | 2 * 174 | hex 0210 | hex fc | hex fa | 0 |
| 2 * 217 | 2 * 202 | hex 0208 | hex fc | hex fa | 0 |
| 2 * 248 | 2 * 232 | hex 0204 | hex fc | hex fa | 0 |
| infinity | 2 * 255 | hex 0202 | hex fc | hex fa | 0 |

TABLE 8

| THRESHV 2 bytes | QN 2 bytes | BSTREAM 2 bytes | MN+ 1 byte | MN− 1 byte | unused 4 bytes |
|---|---|---|---|---|---|
| 2 * 15 | 2 * 6 | hex 8000 | hex 04 | hex 02 | 0 |
| 2 * 32 | 2 * 22 | hex 4000 | hex 3c | hex 3a | 0 |
| 2 * 52 | 2 * 42 | hex 2000 | hex 7c | hex 7a | 0 |
| 2 * 73 | 2 * 62 | hex 1000 | hex fc | hex fa | 0 |
| 2 * 92 | 2 * 82 | hex 0800 | hex fc | hex fa | 0 |
| 2 * 113 | 2 * 102 | hex 0400 | hex fc | hex fa | 0 |
| 2 * 136 | 2 * 124 | hex 0300 | hex fc | hex fa | 0 |
| 2 * 161 | 2 * 148 | hex 0280 | hex fc | hex fa | 0 |
| 2 * 188 | 2 * 174 | hex 0240 | hex fc | hex fa | 0 |
| 2 * 217 | 2 * 202 | hex 0220 | hex fc | hex fa | 0 |
| 2 * 248 | 2 * 232 | hex 0210 | hex fc | hex fa | 0 |
| infinity | 2 * 255 | hex 0208 | hex fc | hex fa | 0 |

The statistics area used in coding the magnitude consists of 5 contiguous cells assigned to each one of the states. Each cell has 28 bytes of storage with the exception of the cell assigned to state 0 which has 32 bytes. The extra 4 bytes assigned to the state 0 cell are for the statistics of the QN=0 decision (in state 0, the QN=0 level is included at the beginning of Table 7 with THRESHV=-THR0=2*5). 24 bytes of each cell are used for the statistics of six binary decisions corresponding to Q1–Q6 in FIG. 5. The last 4 bytes in each cell are used to store the address of the table (7 or 8) used by the corresponding state. The following diagram, in which each box represents a 4-byte unit, illustrates this structure:

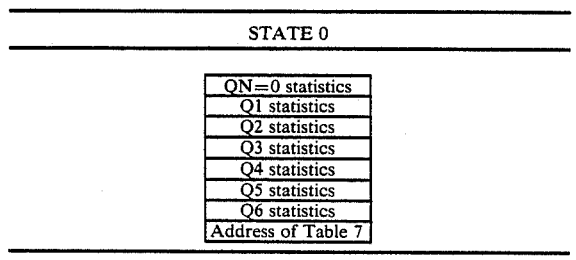

| STATE 1 | STATES 2, 3, or 4 |
|---|---|
| Q1 statistics | Q1 statistics |
| Q2 statistics | Q2 statistics |
| Q3 statistics | Q3 statistics |
| Q4 statistics | Q4 statistics |
| Q5 statistics | Q5 statistics |
| Q6 statistics | Q6 statistics |
| Address of Table 7 | Address of Table 8 |

Flow charts of QCGRAY

Referring again to FIG. 4, the basic structure of the present grayscale compression/decompression system is shown. The grayscale encoder 200 is represented in the implementation as GSEMAIN. The grayscale decoder 210 is represented in the implementation as GSDMAIN. The encoder grayscale model 202 receives pixel graylevel values as DATAIN and generates a sequence of single bit YN binary yes/no decisions as output. These decisions are sufficient to generate DATAOUT which may be only an approximation to DATAIN. Both the encoder and decoder use only the DATAOUT values as history.

The statistics pointer SP (representing a state input) accompanies each decision to indicate where the statistics for the coding process are to be found and updated. The compressed data is completed a byte at a time and can be stored or transmitted during transfer to the decoder 210. The decoder 210 uses adaptive arithmetic decoding to recover each bit YN in the sequence of binary decisions. The statistics pointer SP in the decoder 210 points to the same information for a given decision as was generated for the encoder 200.

The adaptive arithmetic coder 204 and decoder 212 include probability up-dating as part of the generation of the compressed data stream.

To facilitate the description of the implemented system, the following list of definitions is furnished:

YN—Binary decision. YN=0 means 0 was encoded/decoded. YN—=0 means a 1 was encoded/decoded.

THRO—A constant which is the decision level for zero qunatized error in state 0.

STATS—Statistics storage area. Pointers containing addresses of Tables 7 and 8 are also stored in this area.

SIGNSTAT—Statistics storage area for conditioning of the sign (64 entries of 4 bytes each).

STATBIT—Common statistics storage area shared by all states for coding the magnitude bits beyond 6.

BUFFI—Input buffer contains a line of original pixels (DATAIN)

MBUFFER—Mode buffer contains the mode for each pixel and is a fixed offset from BUFFI.

HBUFFER—History buffer contains the reconstructed pixels (DATAOUT) and is a fixed offset from MBUFFER.

X—Next input pixel value.

A—Reconstructed value for pixel to the left of X. It is half the final PRED2 value.

B—Reconstructed value for the pixel above A. As long as B is used before A is stored, it can be at the same position as A. Thus, the HBUFFER can have the history pixels replaced with the current lines reconstructed values during the encoding/decoding of a line.

C—Reconstructed value for the pixel to the right of B and above X.

D—Reconstructed value for the pixel to the right of C.

Mn—See Tables 7 and 8 for the mode bit patterns. The lsb is always 0 for real pixels. The next three bits relate to the sign. The 4 msb's relate to magnitudes. 'FF' is used to flag the right edge of the image. As long as MB is completely used before MA is stored, the modes for the history line can be replaced by the modes for the current line during the encoding/decoding process.

MA—Mode for A (unsigned byte).
MB—Mode for B (unsigned byte).
MC—Mode for C (unsigned byte).
MD—Mode for D (unsigned byte).
M—ORed value of MA, MB, MC, and MD (unsigned byte).

HP—History pointer. All of X, A, B, C, D, MA, MB, MC, and MD, are fixed offsets from HP. Adding 1 to HP shifts these values to the right one position.

SP—Statistics pointer. Increasing SP by 4 moves it to point to the next set of statistics.

SPSV—Saves SP so that it can be restored.

TP—Table pointer which addresses Tables 7 or 8 which contains THRESHV, QN, BSTREAM, MN+, and MN— data sets. Increasing TP by 12 moves it to next data set.

THRESHADDR—Pointer based on SP which initializes TP to the address of Table 7 or 8.

THRESHV—Decision level from Tables 7 or 8.

MN—Mode from Tables 7 or 8. It will be either MN+ or MN— depending upon the sign of the error coded.

QN—Quantization magnitude value from Tables 7 and 8.

BSTREAM—Bit pattern to be used as the binary decisions for QN from Tables 7 or 8.

BITS—Used as a temporary variable during the encoding of BSTREAM.

PEL1—Original pixel value for the leftmost pixel on the first line. This value is transmitted as part of the header so that it can be used in the decoder. The history line is pre-initialized to this value.

PRED2—9 bit precision prediction value. At the start of the encoding or decoding per-pixel loop, PRED2 contains the reconstructed value with a 9 bit precision.

DIFF2—The difference twice the original pixel value X and the predicted value (9 bit precision) PRED2.

DIFFM—Magnitude of DIFF2.

SLOPE—Difference between C and B. It is added to PRED2 to form the 9 bit precision predictor in smooth areas.

L1—Number of pixels per line for a first grayscale encoding scheme. L1 is zero when there is no more data.

L2—Number of pixels per line for a second grayscale encoding scheme. L2 is zero when there is no more data.

Bold lettering in a flow chart symbolizes a more detailed flow chart which is set forth elsewhere. Identical processes for encoder 200 and decoder 210 are often given in bold lettering and explained in a separate figure (even when it is just a simple calculation) to emphasize the commonality. All multiplications (*) and divisions (/) are by powers of two and so can be implemented with the appropriate shifts left and shifts right.

Figure 6:
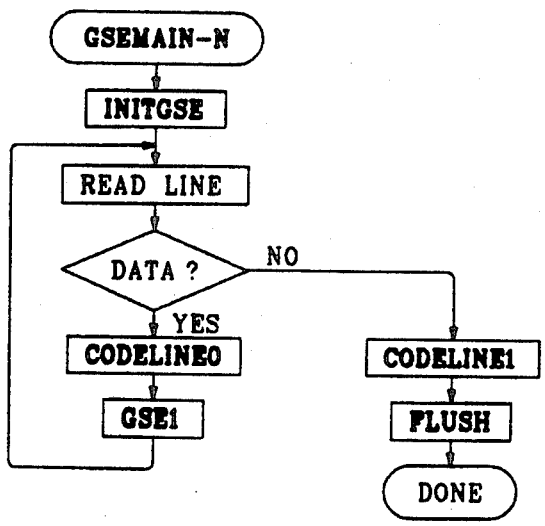
FIG. 6 through FIG. 28 are flowcharts illustrating a software implementation of the invention.

FIG. 6 shows a flow chart of the gray scale encoder GSEMAIN-N which can be used if the scanned output is a non-interlaced display. After the initialization process takes place in INITGSE (FIG. 7), a line of pixels is read into an input buffer. As long as there is another line to be compressed, the encoder encodes a 0 in CODELINE0 at the start of each line. This is done by arithmetically coding the 0 using fixed probabilities (no adaptation) which assume that 0 is more probable. The compression of a line of grayscale compressed data is done in GSE1 (FIG. 8). When there is no more data, the encoder encodes a 1 in CODELINE1 using the same fixed probabilities as CODELINE0. This allows the decoder to know when to stop uniquely. FLUSH transmits the final compressed data bits. FIGS. 33-39 in the co-pending Q-coder application give a detailed embodiment of FLUSH for the Q-coder system. If instead of adaptive arithmetic coding, the bits are being concatenated, then FLUSH just appends enough 0s to complete the final byte.

Figure 7:
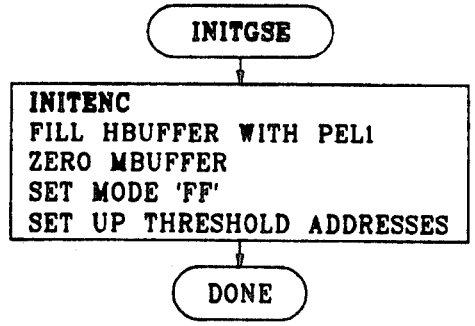
Figure 8:
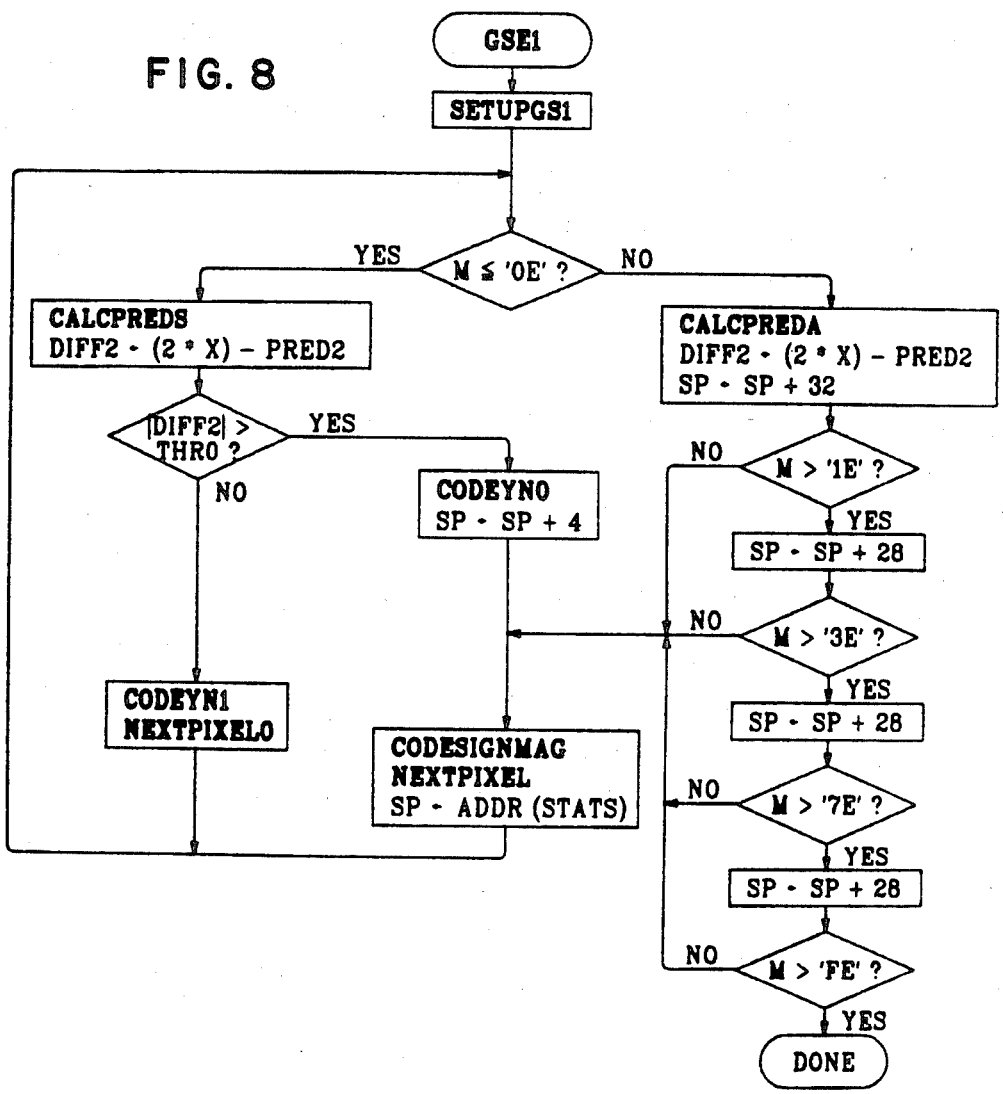
Figure 14:
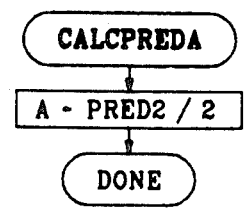

FIG. 7 shows the grayscale encoder initialization process, INITGSE. It starts with initialization of the adaptive arithmetic coder and statistics storage areas in INITENC. An example of INITENC is given in FIG. 14 (and FIG. 15) in the co-pending Q-coder patent application. The history line in HBUFFER is filled with the value of the upper left hand pixel, PEL1. Since this history line has a constant value, a zero slope will be generated during the prediction for the first line pixels. The buffer containing the modes is cleared. The byte beyond the right edge is cleared and the second byte is set to an illegal mode 'FF' to flag the right edge. Threshold addresses must be set up.

The grayscale encoder for a line using the first field encoding scheme is shown in GSE1 (FIG. 8). After initialization in SETUPGS1 (FIG. 9), the per-pixel-loop starts with M containing the OR of modes MC and MD because MA and MB are defined to be zero on the left edge. In general M is defined to be the logical OR of MA, MB, MC, and MD. At the start of the loop M is tested to see if the non-sign related bits (high 4 bits in the byte) are all zero. M is an unsigned byte so all tests with it in FIG. 8 are logical rather than arithmetic comparisons.

Figure 19:
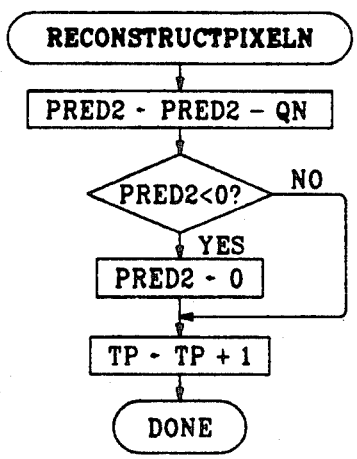

If the 4 msb's of M are zero (State 0), then the special coding of QN=0 is attempted. Note that at the start of every iteration of the per-pixel loop PRED2 contains the previous pixel to 9 bit precision. CALCPRED5 (FIG. 10) calculates the predictor by adding a slope term to PRED2. DIFF2 is found by doubling the input pixel X and subtracting PRED2 from it. If the absolute value of DIFF2 is not greater than the constant THR0, a YN value of 1 is coded in the block CODEYN1 (FIG. 19 and other figures in the co-pending Q-coder patent application). NEXTPIXEL0 (FIG. 11) completes the process of coding QN=0. The encoding process loops back to continue pixel encoding. The statistics pointer SP was not disturbed by this path.

Figure 12:
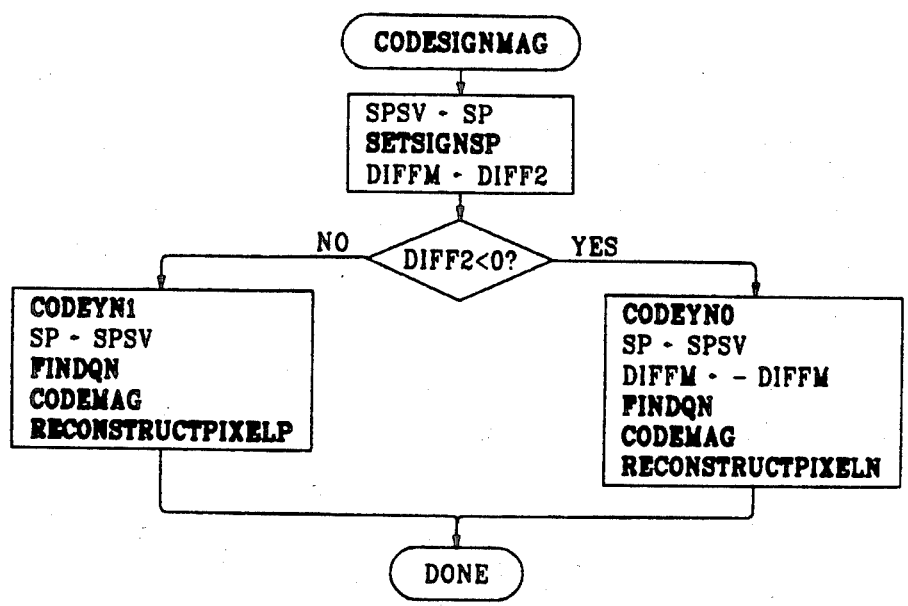
Figure 13:
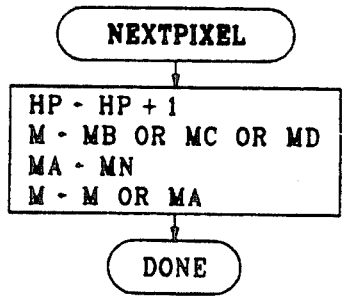

If the pixel difference was larger than THR0, then CODEYN0 (FIG. 21 in the co-pending Q-coder patent application) encodes a 0 to tell the decoder that QN-=0. SP is incremented to the next statistics. The quantized difference sign and magnitude of the first pixel are encoded in CODESIGNMAG (FIG. 12). NEXTPIXEL (FIG. 13) prepares to process the next pixel. The statistics pointer SP must be reset to the start of STATS.

If any of the neighboring modes are states 1, 2, 3, or 4 (indicated by some of the 4 msb's of M being set), then CALCPREDA (FIG. 14) uses only PRED2 (previous pixel with an extra bit of precision) for the predictor without any slope term added. Thus is the adaptive prediction achieved. Then DIFF2 is calculated as the difference between twice X and PRED2. The statistics pointer is incremented in order to skip over the statistics used in the M<'OE' path.

M is then sequentially compared to '1E', '3E', '7E', and 'FE' in order to identify the current state. SP is incremented by 28 bytes for each higher state reached. The mode for the first byte beyond the end of the line is an illegal value of 'FF' and so it causes the state to also be an illegal 'FF'; this state causes an exit from GSE1. Once M fails a test for the next higher state, the processing follows the same path already described for failure to process QN=0 in state 0.

Figure 9:
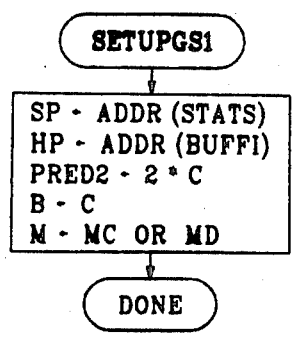

FIG. 9 (SETUPGS1) shows the details of the per line initialization process. The statistics pointer SP is initialized to the address of STATS, the statistics storage area. The history pointer HP points to the start of the input buffer BUFFI. PRED2 is initialized to twice the previous line's left-most pixel C. C is replicated into B so that a slope of zero will be automatically generated for the first pixel. The modes for C and D are ORed together to created the starting M value.

Figure 10:
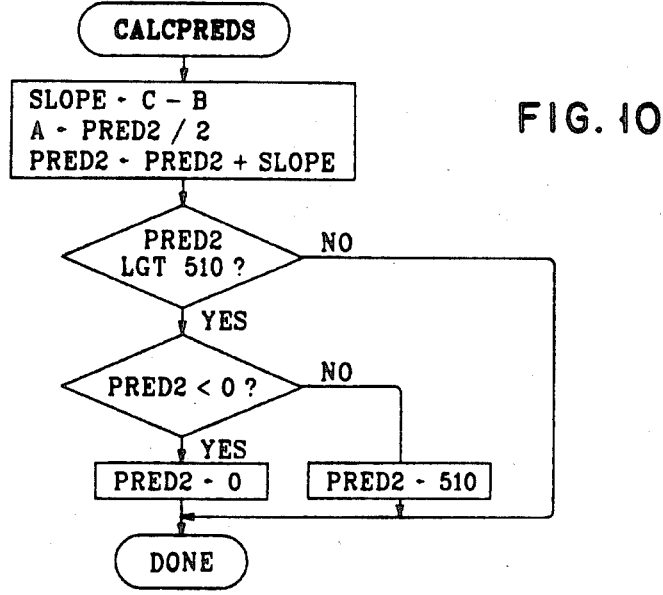

FIG. 10 shows the calculation of the predictor using the slope term. The slope is calculated as the difference between B and C. The old B can then be replaced with new A which is half of PRED2. Then the slope is added into PRED2. The result is limited to values ranging from 0 to 510.

Figure 11:
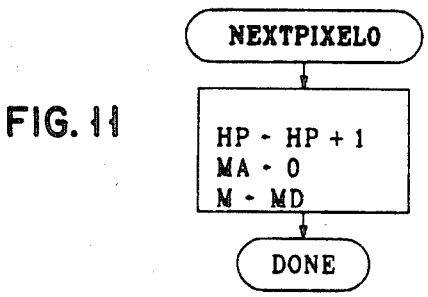

NEXTPIXEL0 in FIG. 11 gives the preparation for the next pixel after QN=0 was coded in state 0. The pointer to the history is moved up one position. The new M is set directly from MD since MA is known to be zero. Also, since MB and MC are known to be mode 0, any contribution from MB or MC can be ignored. This feature is embodied in the flowcharts.

Figure 15:
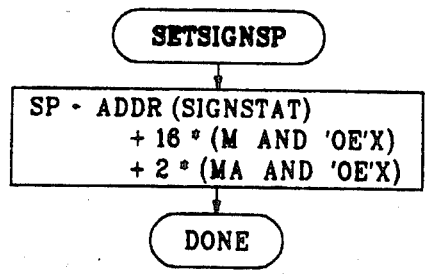
Figure 16:
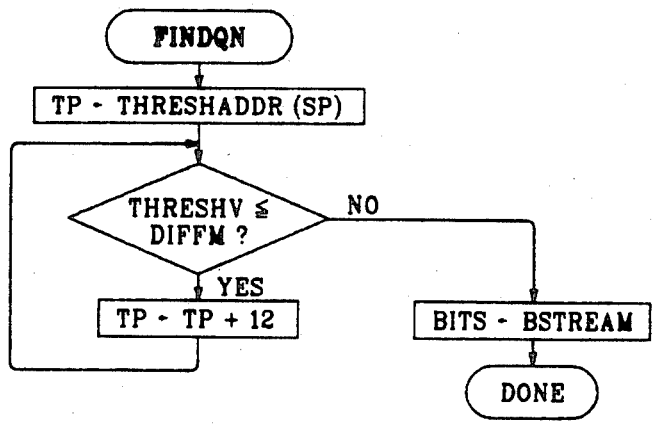
Figure 17:
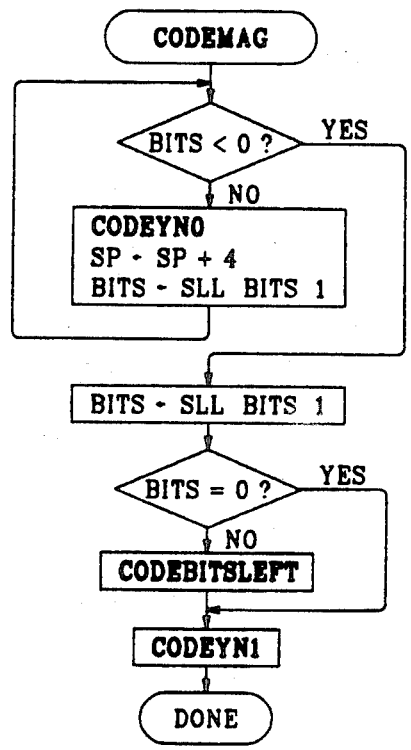
Figure 18:
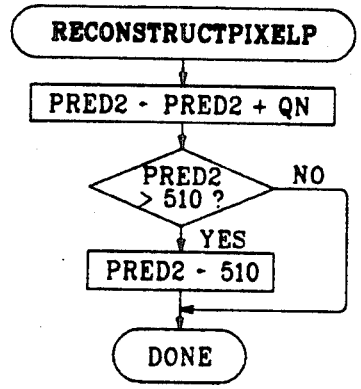

FIG. 12 is a detailed block diagram for CODESIGNMAG which encodes the sign and quantized magnitude of the difference. The value of SP is saved in SPSV before calculating the conditioning state for the sign coding, SETSIGNSP (FIG. 15). The value of DIFF2 is copied into DIFFM for use in the magnitude coding. If the difference is not negative, a YN of 1 is encoded in CODEYN1. The statistics pointer is reset to the saved value, SPSV. The quantized magnitude is found in FINDQN (FIG. 16) and coded in CODEMAG (FIG. 17). The calculation of the reconstructed pixel for this positive path is done in RECONSTRUCTPIXELP (FIG. 18). The path for negative differences is similar except that a 0 is encoded and DIFFM must be inverted to get a positive difference before finding the quanitized value. After encoding in CODEMAG, the pixel is reconstructed in RECONSTRUCTPIXELN for this negative difference path.

In NEXTPIXEL (FIG. 13) the history pointer HP is moved up one position, redefining as pixel A the pixel most recently encoded. The history modes MB, MC, and MD are ORed together and saved in M. Then the new mode MN from Tables 7 or 8 can be stored and also ORed into M.

The CALCPREDA (FIG. 14) processing only needs to store half of the PRED2 value in A. Since PRED2 has already been clamped to values from 0 to 510, no checking is needed on this path for under- or over-flow.

SETSIGNSP (FIG. 15) shows the mask 'OE'X selecting from M and MA just three sign related bits each. These bits are used to select one out of 64 states starting at the address of SIGNSTAT, the statistics area for the sign. Note that the two least significant bits are zero since the statistics are 4 byte quantities.

FINDQN (FIG. 16) shows the encoder loop for determining the proper quantized magnitude. THRESHADDR which is found in the final 4 bytes of the 28 byte statistics cell pointed to by SP is used to initialize the table pointer TP. The address of the correct table (either 7 or 8) for each state was set up in INITGSE. In this way the adaptive quantization is implemented. If the THRESHV value based on TP is less than or equal to DIFFM, then the table pointer is moved to the next set of table entries. Otherwise, BITS is loaded with the bit stream is BSTREAM based on the final TP address.

Figure 20:
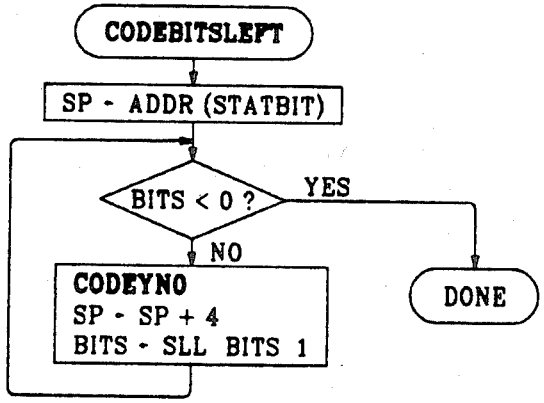

CODEMAG (FIG. 17) encodes the magnitude through a binary decision tree. BITS contains leading zeros for each quantization level which is to be skipped. If there is more than one 1 in BITS, some extra bits must be coded in CODEBITSLEFT (FIG. 20). CODEYN0 encodes a 0 for each leading zero, the the statistics pointer is moved to the next position, and BITS is shifted left by one. When the most significant bit of BITS is a 1, the end of the leading zeros has been found. After shifting out the 1 bit, the remaining bits are tested to see if any more bits are left to code. If BITS is non zero, CODEBITSLEFT (FIG. 20) encodes the remaining bits using the common statistics area. The CODEYN1 terminates the process by coding a 1.

THe QN value from Tables 7 (or 8) is added into PRED2 in RECONSTRUCTPIXELP (FIG. 18). Since positive values are added to PRED2, a check is made to see if PRED2 exceeds 510, the maximum allowed value. If so, it is reset to 510.

RECONSTRUCTPIXELN (FIG. 19) subtracts the positive QN from PRED2 to reconstruct the pixel with a negative Q. If the new PRED2 is negative, it is reset to zero, the minimum allowed value for PRED2. The table pointer is moved one position so that the negative version of MN will be saved in MA later.

The remaining zeros up to the next 1 are encoded in CODEBITSLEFT (FIG. 20). The statistics pointer SP is set to STATBIT area. This is an area for collecting the statistics of all the states when more than 6 dicisions are needed. The coding process of sending zeros for each leading zero is similar to CODEMAG (FIG. 17). Once a 1 is found, all zeros have been encoded.

Figure 21:
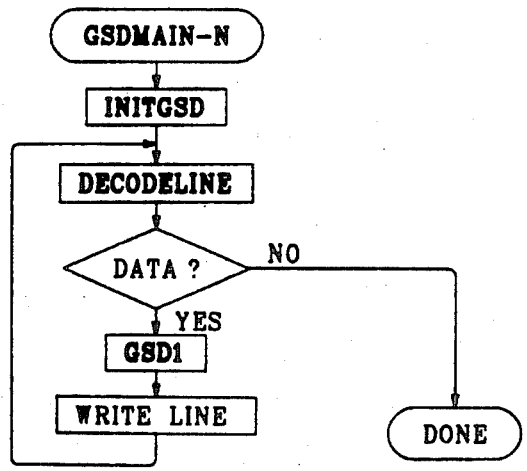

FIG. 21 shows a flow chart of the gray scale decoder GSDMAIN-N which can be used if the output is a non-interlaced display. After the initialization process takes place in INITGSD (FIG. 22), the first decision is decoded in DECODELINE (not shown). If YN is 0, then another line needs to be decoded. The per-line decoder GSD1 (FIG. 23) decodes a line which is then ready to be written to storage or a display. If DECODELINE detects a YN of 1, then the image has been completely decoded.

Figure 22:
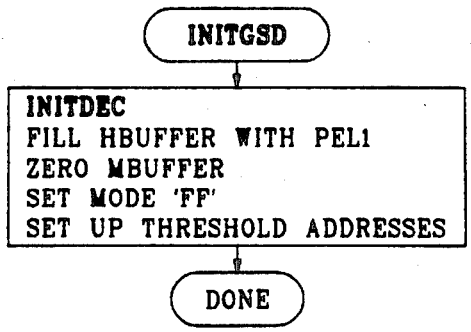

FIG. 22 shows the grayscale decoder initialization process, INITGSD. It is similar to INITGSE except that the initialization for the adaptive arithmetic coder and statistics storage areas is done for the decoder in INITDEC. An example of INITDEC is given in FIG. 40 in the co-pending Q-coder patent application.

Figure 23:
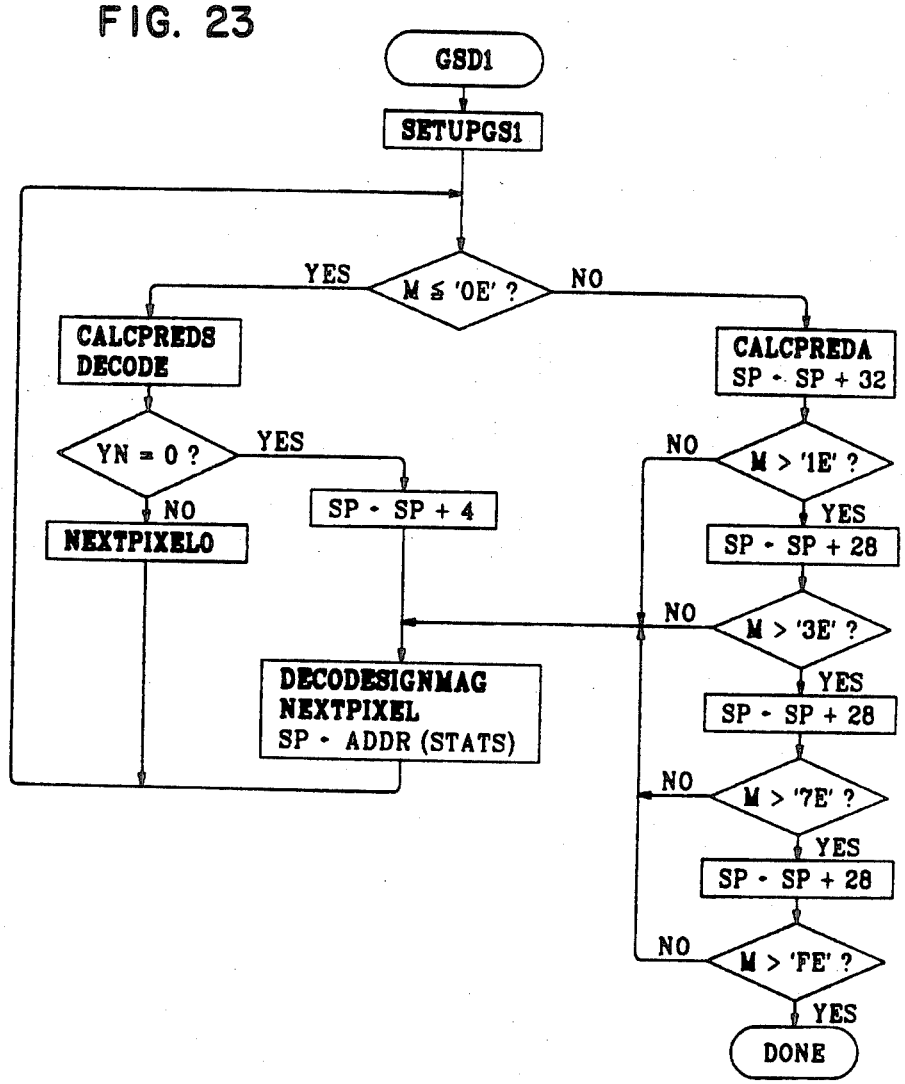

The grayscale decoder for a line using the first field compression scheme is shown in GSD1 (FIG. 23). After initialization in SETUPGS1 (FIG. 9), the per-pixel-loop starts with the value of M tested to see if the non-sign related bits (4 msb's in the byte) are all zero. M is an unsigned byte so all tests with it in FIG. 23 are logical rather than arithmetic comparisons. If the 4 msb's of M are zero, then the special coding of QN=0 is attempted. CALCPREDS (FIG. 10) calculates the predicted value (PRED2) for the pixel using the slope term as well as the previous pixel. Then DECODE (FIG. 22 in the co-pending Q-coder patent application) determines whether QN=0 was decoded (YN--=0). NEXTPIXEL0 (FIG. 11) completes the processing following a pixel decoded with Qn=0. The decoding process loops back to continue pixel encoding. The statistics pointer SP was not disturbed by this path.

Figure 24:
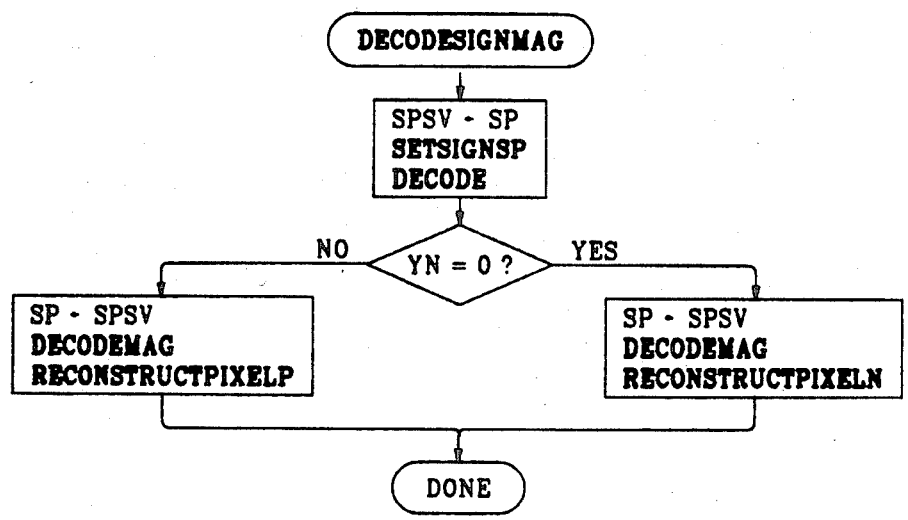

If QN--=0 (YN=0), then the first pixel's quantized difference sign and magnitude are decoded in DECODESIGNMAG (FIG. 24). NEXTPIXEl (FIG. 13) prepares to process the next pixel. The statistics pointer SP must be reset to the start of STATS since it have been moved.

On the other hand if M was greater than 'OE', it is sequentially compared to '1E', '3E', '7E', and 'FE' in order to identify the current state. SP is incremented by 28 bytes for each higher state reached. The mode for the first byte beyond the end of the line is an illegal value of 'FF' and so causes a return from GSD1 by forcing an illegal state. Once M fails a test for the next higher state, the processing follows the same path already described for failure to process QN=0.

Figure 25:
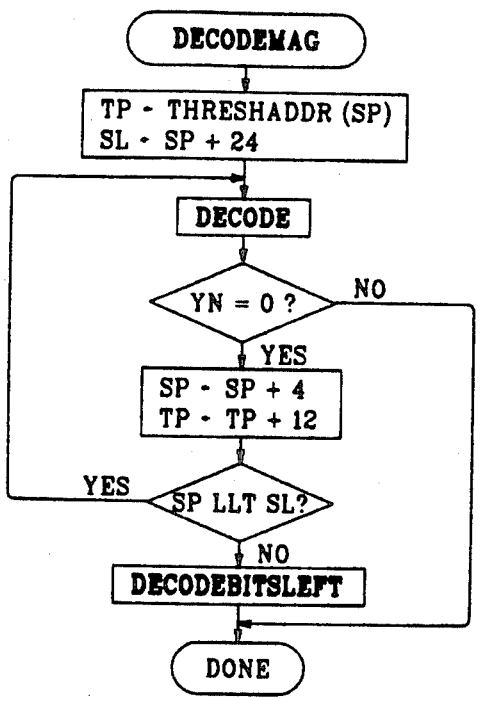

FIG. 24 is a detailed block diagram for DECODESIGNMAG which decodes the sign and quantized magnitude of the difference. The value of SP is saved in SPSV before calculating the conditioning state for the sign coding, SETSIGNSP (FIG. 15). DECODE determines the next YN value. If YN is not zero, a positive QN was encoded. The statistics pointer SP is reset to the saved value, SPSV. The quantized magnitude is decoded in DECODEMAG (FIG. 25). The calculation of the reconstructed pixel for this positive path is done in RECONSTRUCTPIXELP (FIG. 18). If the sign decoded as a 0, it was negative. SP is reset from SPSV. After decoding in DECODEMAG, the pixel is reconstructed in RECONSTRUCTPIEXLN for this negative difference path.

Figure 26:
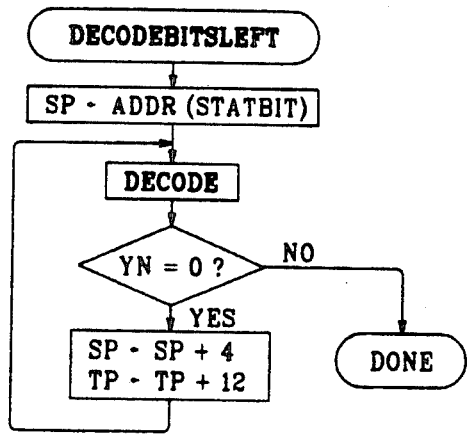

DECODEMAG (FIG. 25) decodes the magnitude. The table pointer is set up from THRESHADDR (which is based on SP). For each YN decision that is zero, SP is moved to the next statistics area and TP is incremented to the next set of table entries. After six zeros have been decoded, the statistics pointer SP will have to be moved to the common statistics area and decoding continued in DECODEBITSLEFT (FIG. 26). SL is calculated in advance to identify that limit and compared against SP after each zero.

The remaining bits up to the next 1 are decoded in DECODEBITSLEFT (FIG. 26). The statistics pointer SP is set to the STATBIT area. For each zero decoded, SP and TP are incremented.

Figure 27:
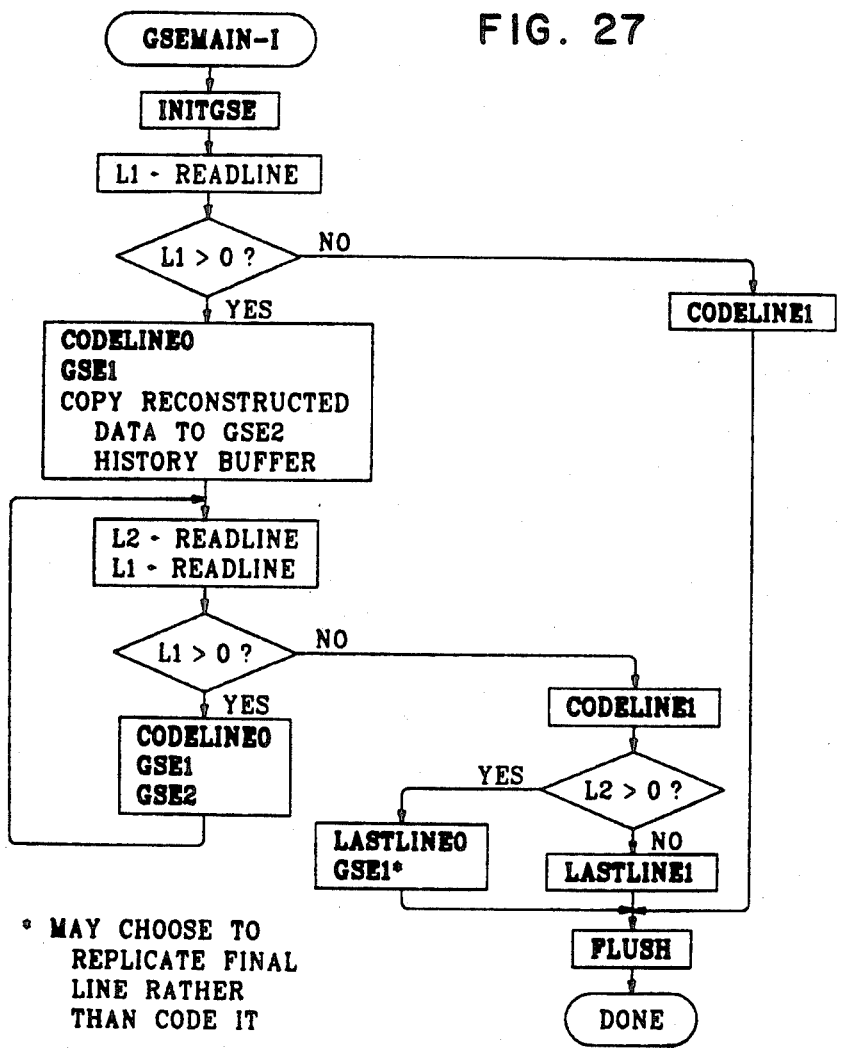
Figure 28:
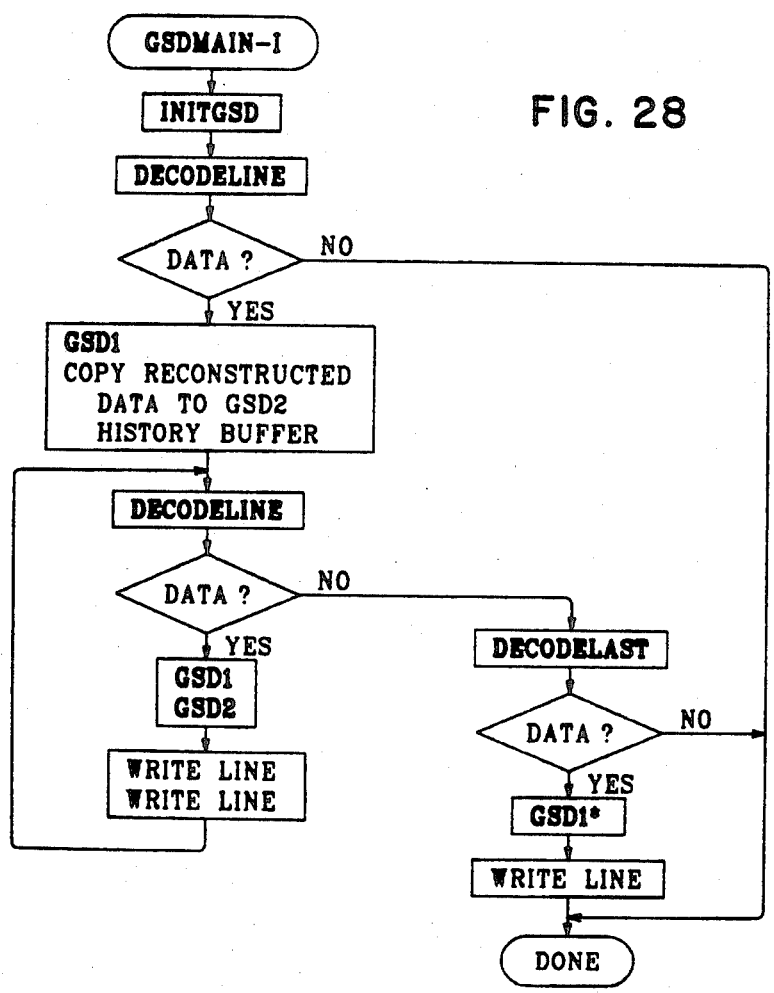

For displays using interlaced video, a second grayscale encoder GSEMAIN-I and decoder GSDMAIN-I system are shown in FIGS. 27 and 28. Two coding schemes are interleaved. They operate on alternate image lines, i.e. the first and second fields. An algorithm which can be used for the first field lines has been described in detail in the preceding flow charts. Adaptive arithmetic coding can be employed if desired. The second field could be compressed with the same algorithm or a different algorithm.

As shown in FIG. 27 and FIG. 28, the two techniques can be alternated on a line by line basis. After initialization in INITGSE (which would be expanded to include the initialization for the second field algorithm), a line is read into the input buffer. L1 saves the number of bytes successfully read. When L1 (or L2) is zero, there is no more input data. The first line is encoded and then reconstructed output is copied into the history buffer for GSE2. As long as a pair of lines can be read into the first and second field input buffers, the remaining first field lines are encoded and are immediately followed by encoding the preceding second field line in GSE2. When there are no more first field lines (L1=0), then the final second field line is encoded using the first field algorithm. Alternately, it can be skipped.

The decoder GSDMAIN-I decodes the first line and then decodes the third line followed by the second line. The pairs of lines are decoded until DECODELINE detects that no more pairs of lines are to be decoded. The final line may be decoded with the first field algorithm.

The present system has been designed for simple and efficient implementation in hardware or software. The typical cpu time spent in compressing the first field of a 512×480×8 graylevel image in a PC-AT is 9 sec. The efficiency and simplicity of the system is largely attributable to the features of the present invention. Experiments have shown improvements relating to the adaptive prediction and adaptive quantization methodology set forth herein.

While the invention has been described with reference to preferred embodiments thereof, it will be understood by those skilled in the art that various changes in form and details may be made without departing from the scope of the invention. For example, the adaptive arithmetic coder and decoder can be replaced with bit concatenation of the yes/no decisions. Then a bit-by-bit examination of the compressed data stream recovers the YN sequence. In addition, although the present invention sets forth specific bit representations for re-mapping, the representations may be varied according to the invention. By way of example, re-mapped bits may be inverted (e.g., the "001" for a weak minus sign may be alternatively represented as "110") with any required changes in implementation being within the skill of an ordinary artisan. Also, the re-mapped binary values may be alternatively defined. For example, instead of 0000 corresponding to the lowest quantization levels and 1111 corresponding to the highest, the representations may be reversed with 1111 corresponding to the lowest, 0111 corresponding to the second lowest, . . . , 0000 corresponding to the highest quantization levels. Moreover, the number of bits may exceed four bits if desired. Such binary representations for re-mapped values are readily substitutable with straightforward logic alterations which are well within the skill of one ordinarily skilled in the art.

We claim as our invention:

1. A differential pulse code modulation (DPCM) data compression system in which a predicted value P is subtracted from an input signal value X to provide a difference signal value which is to be quantized, the system comprising:

a plurality of selectable quantizers for quantizing a difference signal input;

a plurality of selectable predictor calculators;

entropy encoder means for producing code outputs in response to decision inputs and state inputs, the state inputs providing a context for the decision inputs received;

activity indicator means for indicating the level of input signal activity based on quantized difference history;

first selector means, which receives the output of the activity indicator means as input, for selecting one of the quantizers based on the activity indicator output; and second selector means, which receives the output of the activity indicator means as input, for selecting as the predictor P the output of one of the predictor calculators based on the activity indicator output;

wherein said entropy encoding means receives the output of the activity indicator means as a state input thereto.

2. The system of claim 1 wherein the system is an image processing system in which an input signal corresponds to the value for a subject pixel and wherein said activity indicator means is based on values of prescribed pixels neighboring the subject pixel, said activity indicator means including:

(a) means for re-mapping quantized difference values to a reduced set of values;

(b) means for assigning re-mapped values to prescribed neighboring pixels which have previously determined quantized difference values; and (c) aggregating means for combining the re-mapped values of the prescribed neighboring pixels to provide a state value;

the state value being received by the entropy encoding means as a magnitude state input.

3. The system of claim 1 further comprising:

means for assigning a sign value to each possible quantized difference value; and means for computing a sign state value for a subject pixel based on the sign values for prescribed neighboring pixels for which sign values have been previously determined;

wherein said entropy encoder means includes means for alternately receiving as input (i) the difference signal sign and the sign state value for entropy encoding the DPCM sign or (ii) the difference signal magnitude and the output of the activity indicator means for entropy encoding the DPCM magnitude.

4. The system of claim 3 further comprising:

decoder means for retrieving the graylevel value of the subject pixel from (i) the entropy encoded DPCM magnitude and (ii) the entropy encoded DPCM sign; and means for conveying the entropy encoded DPCM magnitude and DPCM sign for one subject pixel after another from said encoder means to said decoder means.

5. In a data compression system including an entropy encoder which encodes decision inputs in a context defined by a corresponding state input, a machine-implemented method of modelling differential pulse code modulation (DPCM) image data for entropy coding comprising the steps of:

(a) for a subject pixel, evaluating a predictor value P;

(b) subtracting P from a graylevel value X for the subject pixel to provide a difference value;

(c) quantizing a DPCM signal having a sign and a magnitude from the difference value;

(d) modelling the DPCM signal sign to provide a sign state input to the entropy encoder;

(e) modelling the DPCM signal magnitude to provide a magnitude state input to the entropy encoder;

(f) the entropy encoder encoding the DPCM signal sign in the context defined by the sign state input; and (g) the entropy encoder encoding the DPCM signal magnitude in the context defined by the magnitude state input.

6. The method of claim 5 wherein the entropy encoder and decoder process binary decision data, the method comprising the further step of:

(u) correlating each quantization level with a corresponding binary sequence according to a binary decision tree.

7. The method of claim 5 further comprising the steps of:

(v) entropy encoding the DPCM decision data according to the context thereof; and (w) decoding the graylevel value of the subject pixel from (i) the entropy encoded DPCM magnitude and (ii) the entropy encoded DPCM sign.

8. The method of claim 5 further comprising the step of:

(x) repeating steps (a) through (g) for one pixel after another in an image.

9. The method of claim 5 further comprising the steps of:

(y) for the subject pixel, calculating a plurality of alternate predictors;

(z) selecting one of the calculated predictors based on the magnitude state input for the subject pixel provided in step (d); and (aa) repeating steps (a) through (g), (y), and (z) for one pixel after another in an image;

wherein step (c) includes the steps of:

(aa) storing a plurality of quantization tables, each table providing a quantized value for each possible difference value; and (bb) selecting one of the quantization tables wherein the selection is based on the magnitude state input for the subject pixel provided in step (d).

10. The method of claim 5 wherein step (a) includes the steps of:

(h) for the subject pixel, calculating a plurality of alternate predictors; and (j) selecting one of the calculated predictors based on the magnitude state input for the subject pixel provided in step (e).

11. The method of claim 10 wherein step (c) includes the steps of:

(k) storing a plurality of quantization tables, each table providing a quantized value for each possible difference value; and (l) selecting one of the quantization tables wherein the selection is based on the magnitude state input for the subject pixel provided in step (e).

12. The method of claim 5 wherein the subject pixel has neighboring pixels A, B, C, and D in which (i) pixel A is adjacent to and along the scan line of the subject pixel, and (ii) pixels B, C, and D are adjacent to the subject pixel and are positioned along a previous scan line, wherein step (d) includes the steps of:

(r) identifying each neighboring pixel as having a sign value assigned thereto according to the representations: 000 for no sign; 010 for weak plus sign; 001 for weak minus sign; 110 for strong plus sign; and 101 for strong minus sign;

(s) ORing the sign value representations of pixels A, B, C, and D; and (t) appending the result of the ORing to the sign value representation of one of the pixels adjacent to the subject pixel to provide a 6-bit sign state input for the subject pixel.

13. The method of claim 12 wherein pixel A is to the left of the subject pixel, pixel B is to the upper left diagonal of the subject pixel, pixel C is directly up from the subject pixel, and pixel D is to the upper right diagonal of the subject pixel.

14. The method of claim 5 wherein the subject pixel has neighboring pixels A, B, C, and D in which (i) pixel A is adjacent to and along the scan line of the subject pixel, and (ii) pixels B, C, and D are adjacent to the subject pixel and are positioned along a previous scan line, wherein step (e) includes the step of:

(m) assigning each quantization level of $2\alpha$ possible quantization levels to one of $\lambda$ re-mapped binary values in which the bits set for a binary value depend on the magnitude of the quantization levels assigned thereto, where $\alpha$ is an integer and where $\lambda < 2\alpha$.

15. The method of claim 14 wherein step (e) further includes the steps of:

(n) for each pixel A, B, C, and D neighboring the subject pixel, each of which has a respective predetermined quantized value, re-mapping the quantized values of the neighboring pixels as MMA, MMB, MMC, and MMD, respectively, wherein the re-mapped values are 4-bits in length and wherein re-mapped values corresponding to larger quantization levels have more consecutive set bits starting at the least significant bit then re-mapped values corresponding to smaller quantization levels;

(p) ORing the assigned re-mapped values for pixels A, B, C, and D to obtain a value Mmax; and (q) determining a magnitude state value according to the following conditions:

if Mmax=0000, setting the value to 0;
if Mmax=0001, setting the state value to 1;
if Mmax=0011, setting the state value to 2;
if Mmax=0111, setting the state value to 3; or
if Mmax=1111, setting the state value to 4.

16. The method of claim 15 wherein pixel A is to the left of the subject pixel, pixel B is to the upper left diagonal of the subject pixel, pixel C is directly up from the subject pixel, and pixel D is to the upper right diagonal of the subject pixel.

* * * * *